US012720479B2

(12) United States Patent
Azimi-Sadjadi et al.

(10) Patent No.: US 12,720,479 B2
(45) Date of Patent: Aug. 25, 2026

(54) METHOD FOR MULTIPLE ANTENNA JOINT TIME OF ARRIVAL AND ANGLE OF ARRIVAL ESTIMATION

(71) Applicant: ZaiNar, Inc., Redwood City, CA (US)

(72) Inventors: Babak Azimi-Sadjadi, Redwood City, CA (US); Philip A. Kratz, Redwood City, CA (US); Raquel Guerreiro Machado, Redwood City, CA (US)

(73) Assignee: ZaiNar, Inc., Redwood City, CA (US)

( * ) Notice: Subject to any disclaimer, the term of this patent is extended or adjusted under 35 U.S.C. 154(b) by 0 days.

(21) Appl. No.: 19/086,774

(22) Filed: Mar. 21, 2025

(65) Prior Publication Data

US 2025/0310933 A1 Oct. 2, 2025

Related U.S. Application Data

(60) Provisional application No. 63/568,361, filed on Mar. 21, 2024.

(51) Int. Cl.

| | |
|---|---|
| ***H04W 64/00*** | (2009.01) |
| ***G01S 3/46*** | (2006.01) |
| ***G01S 5/02*** | (2010.01) |

(52) U.S. Cl.
CPC ............. *H04W 64/003* (2013.01); *G01S 3/46* (2013.01); *G01S 5/0218* (2020.05)

(58) Field of Classification Search
CPC ....... H04W 64/003; G01S 3/46; G01S 5/0218
See application file for complete search history.

(56) References Cited

U.S. PATENT DOCUMENTS

| | | | | |
|---|---|---|---|---|
| 2017/0286730 | A1* | 10/2017 | Sadr | G06K 7/10099 |
| 2018/0287822 | A1 | 10/2018 | Wang et al. | |
| 2019/0253282 | A1 | 8/2019 | Hadaschik et al. | |
| 2020/0200861 | A1* | 6/2020 | Alawsh | G01S 5/06 |
| 2021/0337357 | A1* | 10/2021 | Kassas | G01S 5/0205 |

(Continued)

FOREIGN PATENT DOCUMENTS

CN 115442760 A 12/2022

OTHER PUBLICATIONS

Gaber et al, Joint estimation of time delays and directions of arrival using proper set of antenna elements of a high-order antennal array, Digital Signal Processing 94, (2019), pp. 114-124.

(Continued)

*Primary Examiner* — Barry W Taylor
(74) *Attorney, Agent, or Firm* — Run8 Patent Group, LLC; Peter Miller; Brian T. Chew

(57) ABSTRACT

A method includes: accessing a ranging signal transmitted from a transmitter and received at a set of antenna elements via a channel; recording time domain samples representing the ranging signal; accessing steering matrices characterized by a time delay grid, a phase angle grid, and distances between antenna elements and a reference antenna element; generating a structured data representation of the time domain samples characterized by the steering matrices; calculating a sparse representation of the channel by executing L1-norm regularization based on the structured data representation; and calculating a time of arrival estimate and an angle of arrival estimate for the ranging signal based on the sparse representation of the channel.

19 Claims, 6 Drawing Sheets

(56) References Cited

U.S. PATENT DOCUMENTS

2024/0085547 A1* 3/2024 Azimi-Sadjadi ...... G01S 5/0218
2026/0082241 A1* 3/2026 Barzegar ............. H04L 25/0254

OTHER PUBLICATIONS

International Search Report received in PCT/US25/20918 dated Jun. 26, 2025.
Kotaru et al, Decimeter Level Localization Using WiFi, SIGCOMM '15, Aug. 17-21, 2015, London, United Kingdom.
Li et al, Joint Time Delay and Angle Estimation Using the Matrix Pencil Method Based on Information Reconstruction Vector, KSII Transactions on Internet and Information Systems vol. 12, No. 12, Dec. 2018.
Li et al., Super-Resolution TOA Estimation With Diversity for Indoor Geolocation, IEEE Transactions on Wireless Communications, vol. 3, No. 1, Jan. 2004.

* cited by examiner

METHOD FOR MULTIPLE ANTENNA JOINT TIME OF ARRIVAL AND ANGLE OF ARRIVAL ESTIMATION

CROSS-REFERENCE TO RELATED APPLICATIONS

This Application claims the benefit of U.S. Provisional Application No. 63/568,361, filed on 21 Mar. 2024, which is incorporated in its entirety by this reference.

This Application is related to U.S. patent application Ser. No. 18/513,332, filed on 17 Nov. 2023, U.S. patent application Ser. No. 17/511,433, filed on 26 Oct. 2021, U.S. application Ser. No. 17/379,873, filed on 19 Jul. 2021, U.S. patent application Ser. No. 17/105,458, filed on 25 Nov. 2020, and U.S. patent application Ser. No. 16/846,030, filed on 10 Apr. 2020, each of which is incorporated in its entirety by this reference.

TECHNICAL FIELD

This invention relates generally to the field of network-based positioning and, more specifically, to a new and useful method for multiple antenna joint time of arrival and angle of arrival estimation within the field of network-based positioning.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Methods

As shown in FIGS. 1A, 1B, 1C, and 1D, a method S100—for joint time of arrival and angle of arrival estimation for a signal—includes accessing a ranging signal transmitted from a transmitter and received at a set of antenna elements of a receiver via a channel in Block S102. The ranging signal includes a set of multiplexed sub-signals. Each multiplexed sub-signal, in the set of multiplexed sub-signals, is characterized by a frequency in a set of frequencies.

The method S100 also includes, for each antenna element in the set of antenna elements: recording a subset of time domain samples, in a set of time domain samples, representing the ranging signal received at the antenna element in Block S104; and accessing a steering matrix in a set of steering matrices in Block S106. The steering matrix is characterized by: the set of frequencies; a set of time delay values; a set of phase angle values; and a distance between the antenna elements and a reference antenna element in the set of antenna elements.

The method S100 further includes: generating a structured data representation of the set of time domain samples characterized by the set of steering matrices and a set of channel coefficients in Block S108; calculating a sparse representation of the channel by executing a sparse recovery algorithm based on the structured data representation of the set of time domain samples in Block S110; and calculating a time of arrival estimate and an angle of arrival estimate for the ranging signal received at the set of antenna elements based on the sparse representation of the channel in Block S112.

Figure 2A:
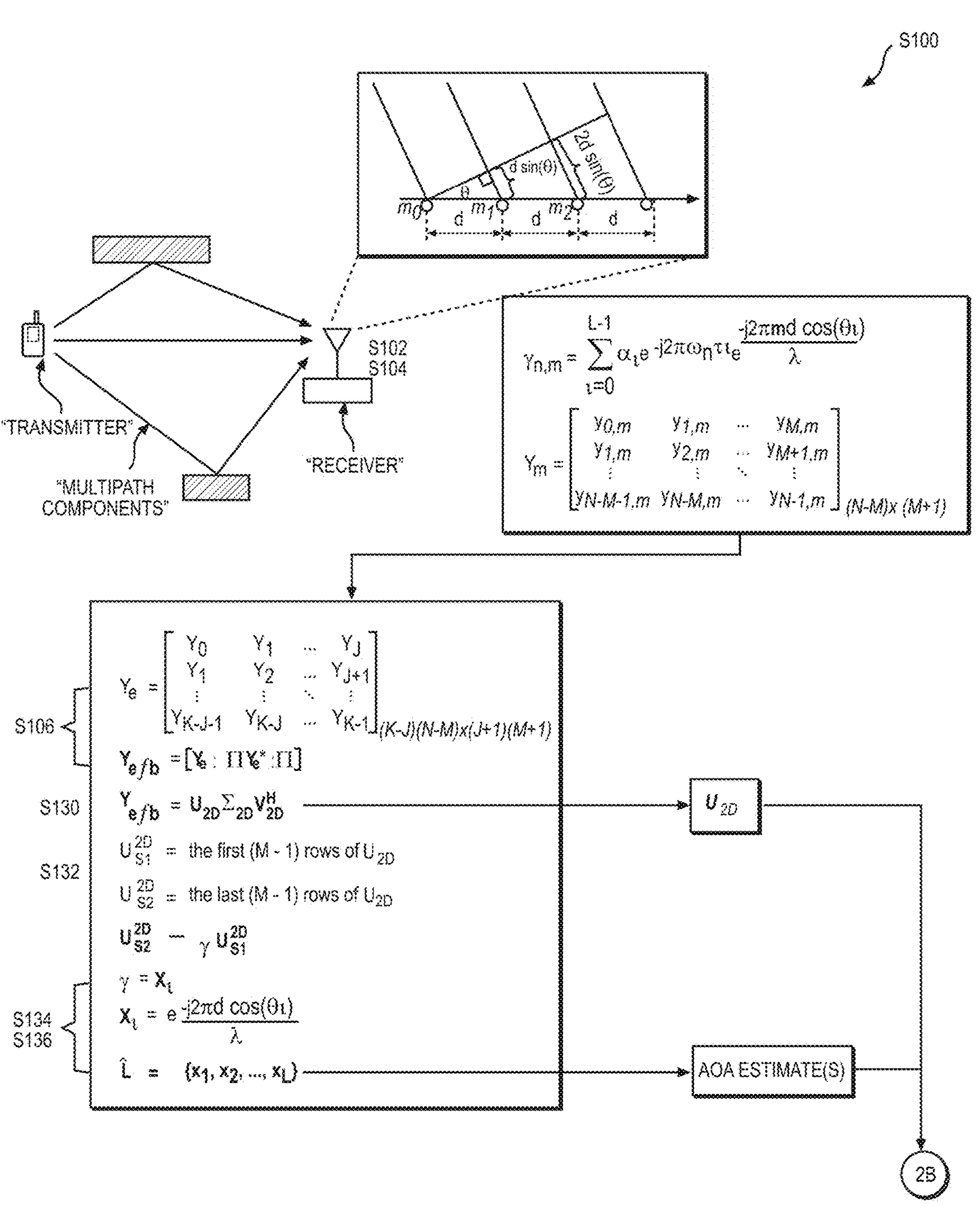
FIGS. 2A and 2B are flowchart representations of one variation of the method.
Figure 2B:
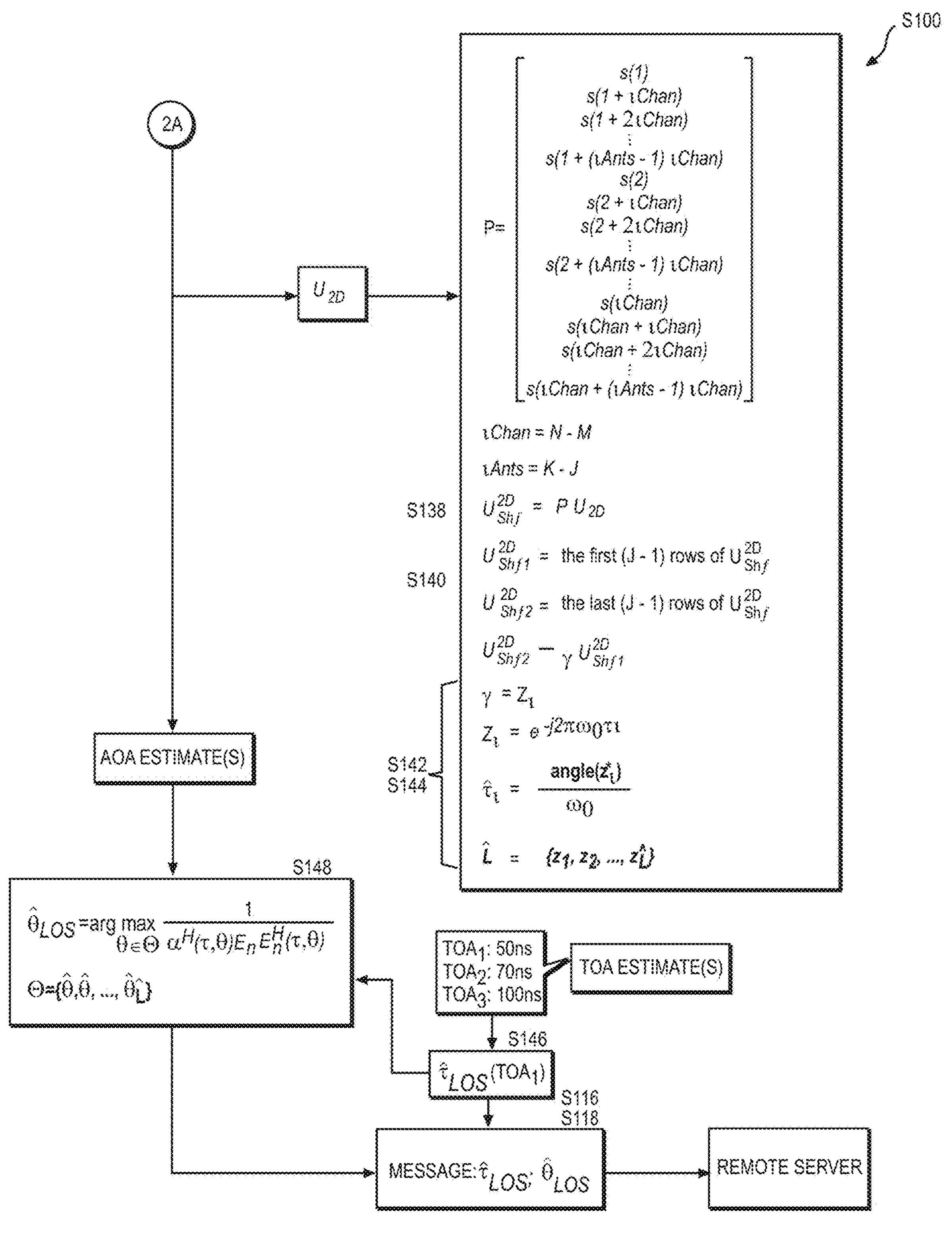

1.1 Variation: Time of Arrival and Angle of Arrival Estimation Via Matrix Pencil As shown in FIGS. 2A and 2B, one variation of the method S100 includes: accessing a ranging signal transmitted from a transmitter and received at a set of antenna elements of a receiver in Block S102; for each antenna element in the set of antenna elements, recording a subset of time domain samples, in a set of time domain samples, representing the ranging signal received at the antenna element in Block S104; generating a structured data representation of the set of time domain samples in Block S108; and generating a decomposed representation of the set of time domain samples by executing a matrix decomposition operation on the first structured data representation of the set of time domain samples in Block S130. The ranging signal includes a set of multiplexed sub-signals. Each multiplexed sub-signal, in the set of multiplexed sub-signals, is characterized by a frequency in a set of frequencies. The decomposed representation includes a signal subspace matrix.

This variation of the method S100 also includes: generating a first set of matrices based on the decomposed representation in Block S132; calculating a first set of generalized eigenvalues according to a first matrix pencil characterized by the first set of matrices in Block S134; and calculating a set of angle of arrival estimates for the ranging signal based on the first set of generalized eigenvalues in Block S136. The first set of matrices includes: a first matrix including a first subset of rows of the signal subspace matrix; and a second matrix including a second subset of rows of the signal subspace matrix.

This variation of the method S100 further includes: generating a shuffled matrix based on the decomposed representation and a shuffling matrix in Block S138; generating a second set of matrices based on the shuffled matrix in Block S140; calculating a second set of generalized eigenvalues according to a second matrix pencil characterized by the second set of matrices in Block S142; and calculating a set of time of arrival estimates for the ranging signal based on the second set of generalized eigenvalues in Block S144. The second set of matrices includes: a third matrix including a third subset of rows of the shuffled matrix; and a fourth matrix including a fourth subset of rows of the shuffled matrix.

This variation of the method S100 also includes: selecting a first time of arrival estimate, in the set of time of arrival estimates, as corresponding to a line of sight component of the ranging signal in Block S146; and identifying a first angle of arrival estimate, in the set of angle of arrival estimates, corresponding to the first time of arrival estimate in Block S148.

1.2 Variation: Time of Arrival Estimation Via L1-Norm Regularization

As shown in FIGS. 1A, 1B, 1C, and 1D, one variation of the method S100 includes: accessing a ranging signal transmitted from a transmitter and received at a set of antenna elements of a receiver via a channel in Block S102; and recording a set of time domain samples representing the ranging signal received at the set of antenna elements in Block S104. The ranging signal includes a set of multiplexed sub-signals characterized by a set of frequencies.

This variation of the method S100 also includes accessing a set of steering matrices in Block S106, the set of steering matrices characterized by: the set of frequencies; a set of time delay values; a set of phase angle values; and distances between antenna elements, in the set of antenna elements, and a reference antenna element in the set of antenna elements.

This variation of the method S100 further includes: generating a structured data representation of the set of time domain samples characterized by the set of steering matrices and a set of channel coefficients in Block S108; calculating a sparse representation of the channel by executing L1-norm regularization based on the structured data representation of the set of time domain samples in Block S110; and calculating a time of arrival estimate for the ranging signal received at the set of antenna elements based on the sparse representation of the channel in Block S112.

2. Applications

Generally, a system—including or interfacing with a receiver (or transceiver) and/or a remote server—can execute Blocks of a method S100 to jointly estimate a time of arrival and an angle of arrival of a ranging signal, transmitted by a transmitter and received at the receiver, in order to enable accurate ranging and localization of the transmitter.

Generally, a time of arrival estimate may be limited in accuracy by bandwidth (e.g., four megahertz, five megahertz) of the ranging signal, such as for a narrowband ranging signal. Accordingly, the system can execute Blocks of the method S100: to receive the ranging signal at multiple antennas (e.g., two antenna elements, three antenna elements, four antenna elements) of a receiver; to combine measurement data generated based on reception of the ranging signal at these antenna elements; and to jointly estimate a time of arrival and an angle of arrival of the ranging signal at the receiver based on these combined measurement data.

For example, the system can execute Blocks of the method S100: to receive the ranging signal at each antenna element of an antenna array via a channel; to capture a series of time domain samples representing the ranging signal at each antenna element; to extract angular information for the ranging signal at each antenna; to coherently combine these time domain samples and angular information—for all antenna elements of the antenna array—into a structured data representation of the ranging signal; to compute a sparse representation of the channel based on a sparse signal recovery algorithm (e.g., L1-norm optimization, least absolute shrinkage and selection (hereinafter "LASSO") optimization) in order to identify significant multipath components of the ranging signal; and to calculate time of arrival estimates and angle of arrival estimates for these significant multipath components of the ranging signal based on the sparse representation of the channel.

Therefore, the system can augment frequency-based channel state information with angle-based channel state information from multiple antennas in order to increase measurement diversity for channel response estimation, thereby increasing resolution for channel response estimation—and/or increasing accuracy of time of arrival estimation—while occupying the same bandwidth (e.g., without increasing bandwidth) for the ranging signal.

2.1 Examples

In one example application, the system executes Blocks of the method S100: to receive ranging signals transmitted from a set of asset tags to a multiple-input and multiple-output (hereinafter "MIMO") access point within a warehouse; to combine measurement data generated based on reception of these ranging signals at the MIMO access point; and to estimate a time of arrival for each ranging signal based on these combined measurement data in order to more accurately localize these asset tags within the warehouse exhibiting intense multipath characteristics due to geometries of the warehouse interior (e.g., floor, ceiling, walls) and a dynamic environment within this interior (e.g., pallets of goods being moved within the warehouse, forklifts traversing the warehouse floor), etc.

In another example application, the system executes Blocks of the method S100: to receive ranging signals transmitted from a set of mobile devices to a 5G-gNodeB device arranged on a rooftop of a building in an urban environment; to combine measurement data generated based on reception of these ranging signals at the 5G-gNodeB device; and to estimate a time of arrival for each ranging signal based on these combined measurement data in order to more accurately localize these mobile devices within the urban environment exhibiting intense multipath characteristics due to geometries of the urban environment (e.g., street pavement, building walls, automobiles traversing the street).

2.2 Variation: MUSIC

As described herein, the system executes Blocks of the method S100: to receive a ranging signal at multiple antennas; to combine measurement data generated based on reception of the ranging signal at these antennas; to compute a sparse solution to a cost function based on a regularization technique and these measurement data; and to calculate a time of arrival estimate for the ranging signal based on this sparse solution.

However, the system can similarly execute Blocks of the method S100: to receive a ranging signal at multiple antennas; to combine measurement data generated based on reception of the ranging signal at these antennas; to identify a time of arrival associated with each multipath component of the ranging signal, as well as a power associated with each multipath component, based on a multiple signal classification (hereinafter "MUSIC") algorithm by calculating eigenvectors of a covariance matrix of the ranging signal; and to calculate a phase-amplitude time of arrival by selecting the earliest time of arrival as a line of sight time of arrival.

2.3 Variation: Matrix Pencil

Additionally or alternatively, the system can similarly execute Blocks of the method S100: to receive a ranging signal at multiple antennas; to combine measurement data generated based on reception of the ranging signal at these antennas; to define matrix pencils based on shift matrices representing these measurement data; to identify a set of time of arrival estimates and a set of angle of arrival estimates for the ranging signal based on a Matrix Pencil algorithm by calculating generalized eigenvectors for these matrix pencils; to select an earliest time of arrival estimate, in the set of time of arrival estimates, as corresponding to a line of sight component of the ranging signal; and to identify an angle of arrival estimate—in the set of angle of arrival estimates—corresponding to the earliest time of arrival estimate, such as by executing a MUSIC algorithm for the set of angle of arrival estimates according to the earliest time of arrival estimate.

3. System

Generally, the system can include and/or interface with a communication network (e.g., a wired communication network, a wireless communication network), such as a mesh network described in U.S. patent application Ser. No. 17/105,458. The system can include and/or interface with: a set of transceivers (or "receivers") (e.g., base stations, custom wireless tag readers, 5G gNodeBs, 5G radio units, 5G transmit and receive points, 4G-LTE eNodeBs); and a set of transmitters (e.g., passive or active tags, 5G or 4G-LTE user equipment). Additionally, the system can include and/or interface with a remote computer system (e.g., a remote server, a leading transceiver).

A transceiver is configured to receive ranging signals transmitted from other transceivers and/or transmitters in the mesh network. In one example, the transceiver locally executes Blocks of the method S100 in response to receiving a ranging signal. In another example, in response to receiving a ranging signal, the transceiver transmits raw waveform data—or an intermediate output of the method S100—to the remote computer system for further processing according to Blocks of the method S100. Therefore, the system can execute Blocks of the method S100 at transceivers within a mesh network or at a remote computer system that may track other parameters characterizing the mesh network (e.g., the relative location and time biases of each transceiver in the mesh network).

In one implementation, transceivers in the mesh network self-localize based on ranging signals transmitted from transceiver to transceiver in the mesh network. More specifically, the system can: calculate distances between each pair of transceivers based on these ranging signals; and, in response to sufficient connectivity between transceivers in the mesh network, estimate a relative location of each transceiver in the mesh network.

Additionally or alternatively, the system can execute Blocks of the method S100 with respect to ranging signals sent from a transmitter (e.g., a passive or active tag, 5G or 4G-LTE, user equipment) to a transceiver, such as part of an uplink localization protocol. Thus, by executing multiple iterations of the method S100 for a ranging signal transmitted from a transmitter and received by multiple transceivers, the system can calculate accurate times of flight for the ranging signal at each transceiver in the mesh network and can execute time-of-arrival and/or time-difference-of-arrival multilateration to estimate a position of the transmitter.

In another implementation, Blocks of the method S100 are executed by a receiver of multiple ranging signals in a downlink localization protocol. In this implementation, a single receiver (e.g., 5G or 4G-LTE) executes Blocks of the method S100 for each ranging signal received by the receiver. The receiver can then estimate its location given a location of the transmitter of each received ranging signal.

Generally, the method S100 is described below with respect to a ranging signal transmitted by a transmitter and received by a receiver. However, the receiver and transmitter described below may be deployed in any of the contexts described above. Additionally, Blocks of the method S100 can be executed by a receiver of a ranging signal, by a remote computer system, or by a combination of both.

3.1 Receiver

Generally, the system can include a receiver configured to receive ranging signals transmitted from a transmitter. More specifically, the receiver can include RF receiving components, such as an antenna, amplifiers, mixers, filters, an analog-to-digital converter (hereinafter "ADC"), and/or a digital signal processor (hereinafter "DSP") arranged in a superheterodyne, heterodyne, or homodyne architecture.

In one example, the receiver includes a set of antennas (e.g., three antennas, four antennas). More specifically, the receiver can include an antenna array defining a set of antenna elements, each antenna element positioned (e.g., fixed) at a known distance (e.g., five centimeters) from another antenna element in the antenna array (e.g., a uniform linear array).

In one implementation, the system can include a receiver, such as a wireless base station or wireless node within a network (e.g., a 4G or 5G network, a wireless local area network). In this implementation, the system can time synchronize the receiver with other receivers in the network in order to improve localization of transmitters within range of multiple receivers.

4. Ranging Signal

Generally, a receiver can receive a ranging signal including a set of multiplexed sub-signals, wherein each sub-signal is characterized by a unique carrier frequency in a set of carrier frequencies. The receiver can estimate the time of arrival of the ranging signal in response to receiving the ranging signal.

Additionally, the system can: capture a series of time domain digital samples representing the ranging signal; and calculate a sample-based time of arrival estimate based on the series of time domain digital samples. By recording a series of samples representing the ranging signal, the system can calculate a more accurate sample-based time of arrival estimate by executing matched filter techniques or other super-resolution techniques that are more effective with increased signal length and complexity.

4.1 Carrier Frequency Hopping Scheme

In one implementation, the system can receive a ranging signal including a set of time division multiplexed sub-signals each characterized by a unique carrier frequency (e.g., a carrier frequency hopping scheme). More specifically, in this implementation, the system can receive a frequency-hopping spread spectrum signal including the set of multiplexed sub-signals, each multiplexed sub-signal characterized by the frequency in the set of frequencies.

In this implementation, the transmitter can transmit time-division-multiplexed sub-signals in successive slots of a time-division multiplexing scheme in order to provide phase information across multiple frequencies. The system can receive each successive sub-signal during the corresponding slot and extract the timing and phase information from that signal. The transmitter can vary the carrier frequency of each successive sub-signal such that the frequencies characterizing the set of sub-signals spans the available bandwidth within the channel. The system can calculate the time of arrival of each sub-signal and the phase of each sub-signal. The system can then calculate an accurate time of flight between the transmitter and receiver based on these times of arrival and these phases extracted from the ranging signal.

For example, the system can execute methods and techniques described in U.S. patent application Ser. No. 16/846,030 to extract phase and/or time of arrival from a time-division multiplexed signal.

4.2 Subcarrier Signal Scheme

In another implementation, the system can receive a ranging signal including a set of frequency-division multiplexed (e.g., orthogonal frequency division multiplexed) sub-signals, each sub-signal characterized by a unique sub-carrier frequency. More specifically, the system can receive an orthogonal-frequency-division-multiplexed signal including the set of multiplexed sub-signals, each multiplexed sub-signal characterized by a frequency in the set of frequencies.

In this implementation, the system: receives a single ranging signal including multiple subcarrier signals; and extracts a unique phase corresponding to each subcarrier frequency of the subcarrier signal. Then, the system can execute methods and techniques described in U.S. patent application Ser. No. 17/379,873: to extract the phase information from each subcarrier; and calculate a single time of arrival of the ranging signal.

5. Sample-based Time of Arrival Estimation

Generally, upon receiving the ranging signal from the transmitter, the system can calculate a sample-based time of arrival estimate, $\tau_t$, and a sample-based uncertainty, $\delta_t$, based on a sampling frequency of the receiver. More specifically, the system can directly calculate a time of arrival estimate based on time domain samples captured at the receiver. Upon calculating the sample-based time of arrival estimate, the system can leverage precise time synchronization (or precise characterization of a time bias) between the receiver and the transmitter in order to estimate the time of flight of the ranging signal and, therefore, the distance between the receiver and the transmitter.

The system can detect the time of arrival (or times of arrival in the case of a time-division multiplexed signal) of the ranging signal based on time domain sampling, oversampling, and/or matched filter techniques.

In one implementation, the system can identify a time of arrival based on a set of discrete time domain samples and a matched filter. More specifically, the system can: access a template signal corresponding to the ranging signal; correlate the template signal with the series of time domain samples to identify a correlation peak; and calculate the sample-based time-of-arrival estimate based on the correlation peak.

Alternatively, the system can execute super-resolution methods, such as those described in U.S. patent application Ser. No. 16/846,030, to increase the accuracy and/or precision of calculated time of arrival of the ranging signal. Upon calculating the time of arrival of the ranging signal, the system can access the transmission time of the ranging signal (or each time-divided sub-signal of the ranging signal) in order to calculate a time of flight or a set of times of flight of the ranging signal (assuming sufficient clock synchronization between the transmitter and the receiver, such as nanosecond level clock synchronization). For example, in applications in which the ranging signal is a frequency-division multiplexed signal, the system can subtract the transmission time of the ranging signal from the calculated time of arrival of the ranging signal to calculate a time of flight estimate of the ranging signal. Alternatively, in applications in which the ranging signal is a time-division multiplexed signal, the system can average the differences between corresponding transmission times and time of arrivals of the set of sub-signals including the ranging signal.

6. Sparse Channel Reconstruction Via L1-Norm Optimization

Generally, the system can execute similar methods and techniques as described in U.S. patent application Ser. No. 18/513,332 to compute a sparse reconstruction of a wireless channel including the line of sight and multipath delays for time of arrival estimation.

In one implementation, the system (e.g., a transmitter): generates a ranging signal x(t); modulates the signal by a frequency $\omega=2\pi f$ (e.g., based on a carrier frequency hopping scheme); and transmits the ranging signal through a channel h(t), wherein:

$$h(t)=\sum_{i=1}^{N}\alpha_i\delta(t-\tau_i)$$

In another implementation, the system (e.g., a receiver) executes similar methods and techniques described in U.S. patent application Ser. No. 16/846,030: to receive the ranging signal y(t), wherein y(t)=x(t)*h(t); and to characterize a correlation function $R(\tau)$ based on a correlation of y(t) and x(t), wherein:

$$R_\tau=\sum_{l=0}^{L-1}\alpha_i e^{-j\omega\tau_l}R(\tau-\tau_i)$$

In this implementation, $\tau_0$ corresponds to a first time delay (e.g., a first time of arrival) of a line of sight component of the ranging signal, and $\tau_l$ corresponds to a second time delay (e.g., a second time of arrival) of a multipath component—in a set of multipath components (e.g., L−1 multipath components)—of the ranging signal.

More specifically, the system can define a time grid (e.g., a time delay grid) representing a set of time delay values and an increment $\delta t$ between each time delay value in the set of time delay values. Based on the time grid, and for a set of carrier frequencies $f_i=i\delta_f$, i=0, . . . , N−1, the system can represent the ranging signal (e.g., correlation measurements of the ranging signal) as:

$$\begin{bmatrix} R(\omega_0) \\ R(\omega_0) \\ \vdots \\ R(\omega_{N-1}) \end{bmatrix} =$$

$$\begin{bmatrix} e^{-j\omega_0\tau_0}R(-\tau_0) & e^{-j\omega_0\tau_1}R(-\tau_1) & \dots & e^{-j\omega_0\tau_{L-1}}R(-\tau_{L-1}) \\ e^{-j\omega_1\tau_0}R(-\tau_0) & e^{-j\omega_1\tau_1}R(-\tau_1) & \dots & e^{-j\omega_1\tau_{L-1}}R(-\tau_{L-1}) \\ \vdots & \vdots & \ddots & \vdots \\ e^{-j\omega_{N-1}\tau_0}R(-\tau_0) & e^{-j\omega_{N-1}\tau_1}R(-\tau_1) & \dots & e^{-j\omega_{N-1}\tau_{L-1}}R(-\tau_{L-1}) \end{bmatrix} \begin{bmatrix} \alpha_0 \\ \alpha_1 \\ \vdots \\ \alpha_{L-1} \end{bmatrix}$$

The system can define the set of carrier frequencies within a predefined bandwidth. In one example, the system defines the set of carrier frequencies within a first bandwidth of four megahertz for a narrowband ranging signal transmitted from a transmitter (e.g., an asset tag, an Internet-of-Things device, a 5G user equipment) to a receiver (e.g., a wireless access point, a 5G-gNodeB). In another example, the system defines the set of carrier frequencies within a second bandwidth of 30 megahertz for a wideband ranging signal.

In another implementation, the system can characterize a channel coefficient $\alpha_i$ based on variation responsive to correlation $R(-\tau_i)$. More specifically, the receiver can define the channel coefficient $\alpha_i$ as:

$$\alpha_i = R(-\tau_i)\alpha_i$$

In this implementation, the system can represent the ranging signal as:

$$\begin{bmatrix} y_0 \\ y_1 \\ \vdots \\ y_{N-1} \end{bmatrix} = \begin{bmatrix} e^{-j\omega_0\tau_0} & e^{-j\omega_0\tau_1} & \dots & e^{-j\omega_0\tau_{L-1}} \\ e^{-j\omega_1\tau_0} & e^{-j\omega_1\tau_1} & \dots & e^{-j\omega_1\tau_{L-1}} \\ \vdots & \vdots & \ddots & \vdots \\ e^{-j\omega_{N-1}\tau_0} & e^{-j\omega_{N-1}\tau_1} & \dots & e^{-j\omega_{N-1}\tau_{L-1}} \end{bmatrix} \begin{bmatrix} \alpha_0 \\ \alpha_1 \\ \vdots \\ \alpha_{L-1} \end{bmatrix}$$

The system can define a complex noise vector n. Additionally, the system can represent the ranging signal as z=Aw+n wherein:

$$z = \begin{bmatrix} y_0 \\ y_1 \\ \vdots \\ y_{N-1} \end{bmatrix}$$

$$A = \begin{bmatrix} e^{-j\omega_0\tau_0} & e^{-j\omega_0\tau_1} & \dots & e^{-j\omega_0\tau_{L-1}} \\ e^{-j\omega_1\tau_0} & e^{-j\omega_1\tau_1} & \dots & e^{-j\omega_1\tau_{L-1}} \\ \vdots & \vdots & \ddots & \vdots \\ e^{-j\omega_{N-1}\tau_0} & e^{-j\omega_{N-1}\tau_1} & \dots & e^{-j\omega_{N-1}\tau_{L-1}} \end{bmatrix}$$

and $$w = \begin{bmatrix} \alpha_0 \\ \alpha_1 \\ \vdots \\ \alpha_{L-1} \end{bmatrix}$$

In another implementation, the system can compute a sparse solution-based on a regularization technique (e.g., L1-norm regularization, LASSO regularization)—for the following cost function:

$$\hat{w} = \arg\min_w \|z - Aw\|^2 + \lambda\|w\|_1$$

In this implementation, the system can solve (or compute) the cost function to return a solution representing the set of multi-path components and/or a set of (estimated) times of arrival for the set of multi-path components.

7. Multiple Antenna Joint Time of Arrival and Angle of Arrival Estimation

Generally, the system can access a ranging signal transmitted by a transmitter and received at a set of antenna elements (e.g., a uniform linear array of antenna elements) of a receiver. The ranging signal includes a set of multiplexed sub-signals characterized by a set of carrier frequencies.

The system can: capture time domain samples representing the ranging signal received at each antenna element; extract angular information for the ranging signal at each antenna element; and coherently combine these samples and phase-aligned angular information—for all antenna elements in the set of antenna elements—into a structured data representation of the ranging signal.

The system can then: identify significant multipath components of the ranging signal based on the structured data representation, such as via L1-norm optimization (e.g., LASSO optimization), a MUSIC algorithm, and/or a Matrix Pencil algorithm; and calculate time of arrival estimates (and angle of arrival estimates) for these significant multipath components.

Therefore, the system can augment frequency-based channel state information with angle-based channel state information from multiple antennas in order to increase measurement diversity, thereby increasing accuracy of time of arrival estimation and/or ranging estimation for a ranging signal characterized by limited bandwidth (e.g., four megahertz).

8. Joint Time of Arrival and Angle of Arrival Estimation Via L1-Norm

The method S100 includes: accessing a ranging signal transmitted from a transmitter and received at a set of antenna elements of a receiver via a channel in Block S102; and recording a set of time domain samples representing the ranging signal received at the set of antenna elements in Block S104. The ranging signal includes a set of multiplexed sub-signals characterized by a set of frequencies.

Block S106 of the method S100 recites accessing a set of set of steering matrices characterized by: the set of frequencies; a set of time delay values; a set of phase angle values; and distances between antenna elements, in the set of antenna elements, and a reference antenna element in the set of antenna elements.

The method S100 includes: generating a structured data representation of the set of time domain samples characterized by the set of steering matrices and a set of channel coefficients in Block S108; calculating a sparse representation of the channel by executing L1-norm regularization based on the structured data representation of the set of time domain samples in Block S110; and calculating a time of arrival estimate for the ranging signal received at the set of antenna elements based on the sparse representation of the channel in Block S112.

Generally, in Blocks S102, S104, S106, S108, S110, and S112, the system can: access a ranging signal—transmitted by a transmitter and characterized by a set of frequencies—received at a set of antenna elements K of a receiver via a channel; record time domain samples representing the ranging signal received at each antenna element; access steering matrices representing the set of frequencies, a time delay grid, a phase angle grid, and distances between antenna elements relative to a reference antenna element; generate a structured data representation of the time domain samples characterized by the steering vectors; calculate a sparse representation of the channel by executing sparse signal recovery (e.g., L1-norm optimization, LASSO optimization) based on the structured data representation; and calculate a time of arrival estimate and an angle of arrival estimate for the ranging signal received at the receiver based on the sparse representation of the channel.

More specifically, the system can: define a time delay grid representing a set of time delay values $\tau_0, \tau_1, \ldots, \tau_{L-1}$ (for one line of sight component and L−1 multipath components of the ranging signal); define a phase angle grid representing a set of phase angle values $\theta_0, \theta_1, \ldots, \theta_{M-1}$ (for M possible phase angles); and represent the ranging signal based on a combination of the time delay grid and the phase angle grid, wherein each time delay $\tau_i$ in the time delay grid corresponds to M possible angles in the phase angle grid.

8.1 Signal Transmission

In one implementation, the transmitter transmits (e.g., broadcasts) a ranging signal (e.g., a sounding reference signal) according to a set of configuration parameters.

For example, the transmitter can transmit the ranging signal including a set of multiplexed sub-signals. Each multiplexed sub-signal in the set of multiplexed sub-signals is characterized by a frequency in a set of frequencies.

More specifically, the transmitter can: generate a ranging signal x(t); modulate the signal by the set of frequencies $\omega_i=2\pi f_i$, wherein i=0, . . . , N−1, (e.g., based on a carrier frequency hopping scheme); and transmit the ranging signal.

8.2 Signal Reception

In another implementation, in Block S102, the receiver receives the ranging signal at a set of antenna elements via a channel.

For example, the receiver can include an antenna array defining the set of antenna elements K including a first antenna element $k_0$, a second antenna element $k_1$, and a third antenna element $k_2$, etc. Each antenna element can be positioned at a known distance d (e.g., a uniform distance, a nonuniform distance) from each other antenna element in the antenna array.

More specifically: the second antenna element $k_1$ can be positioned at a first distance $d_1$ (e.g., d) from a reference antenna element, such as the first antenna element $k_0$; the third antenna element $k_2$ can be positioned at a second distance $d_2$ (e.g., 2d) from the reference antenna element; etc.

In this implementation, the receiver executes methods and techniques described in U.S. patent application Ser. No. 16/846,030 to record a set of time domain samples representing the ranging signal received at the set of antenna elements. More specifically, for each antenna element in the set of antenna elements, the receiver can record a subset of time domain samples, in the set of time domain samples, representing the ranging signal received at the antenna element.

For example, the receiver can: record a first subset of time domain samples, in the set of time domain samples, representing the ranging signal received at the first antenna element $K_0$; record a second subset of time domain samples, in the set of time domain samples, representing the ranging signal received at the second antenna element $K_1$; and record a third subset of time domain samples, in the set of time domain samples, representing the ranging signal received at the third antenna element $K_2$; etc.

8.3 Steering Matrices

Generally, in Block S106, the system can access a steering matrix characterized by: a set of carrier frequencies characterizing the ranging signal; a set of time delay values; and a set of phase angle values.

For example, the system can access a steering matrix characterized by a set of frequencies (e.g., carrier frequencies) characterizing a narrowband ranging signal, the set of carrier frequencies exhibiting a bandwidth falling within four megahertz.

More specifically, for each antenna element in the set of antenna elements, the system can access a steering matrix characterized by: the set of frequencies; a set of time delay values; a set of phase angle values; and a distance between the antenna elements and a reference antenna element (e.g., the first antenna element $k_0$) in the set of antenna elements.

For example, the system can access (or define): a first steering matrix for the first antenna element $k_0$, the first steering matrix representing the set of frequencies, the set of time delay values, and the set of phase angle values; a second steering matrix for the second antenna element $k_1$, the second steering matrix representing the set of frequencies, the set of time delay values, the set of phase angle values, and the first distance $d_1$ between the first antenna element and the second antenna element; and a third steering matrix for the third antenna element, the third steering matrix representing the set of frequencies, the set of time delay values, the set of phase angle values, and the second distance $d_2$ between the first antenna element and the third antenna element.

In particular, for each antenna element in the set of antenna elements, the system: accesses the set of frequencies (e.g., $\omega_0, \omega_1, \ldots, \omega_{N-1}$); accesses (or defines) a time delay grid representing the set of time delay values (e.g., $\tau_0, \tau_1, \ldots, \tau_{L-1}$); accesses (or defines) a phase angle grid representing the set of phase angle values (e.g., $\theta_0, \theta_1, \ldots, \theta_{M-1}$; and accesses a distance between the antenna element and the reference antenna element. The system then defines a steering matrix: spanning the set of frequencies, the time delay grid, and the phase angle grid; and representing the distance between the antenna element and the reference antenna element.

In one implementation, the system represents a received signal at an antenna element k as a vector x(n,k,l) of multipath signals that arrive at the antenna element k for $l^{th}$ time delay value at the $n^{th}$ frequency as:

$$x(n,k,l)=\left[e^{-j\frac{2\pi kd\sin\theta_0}{\lambda}},\ e^{-j\frac{2\pi kd\sin\theta_1}{\lambda}},\ \ldots,\ e^{-j\frac{2\pi kd\sin\theta_{M-1}}{\lambda}}\right]e^{-j\omega_n\tau_l}$$

In this implementation, $\lambda$ corresponds to a wavelength of the frequency.

The system can also represent the vector of multipath signals as:

$$x(n,k,l)=s(k)e^{-j\omega_n\tau_l}$$

In this implementation, for each antenna element k, the system defines a steering matrix $A_k$ for the antenna element k, wherein:

$$A_k = \begin{bmatrix} s(k)e^{-j\omega_0\tau_0} & s(k)e^{-j\omega_0\tau_1} & \cdots & s(k)e^{-j\omega_0\tau_{L-1}} \\ s(k)e^{-j\omega_1\tau_0} & s(k)e^{-j\omega_1\tau_1} & \cdots & s(k)e^{-j\omega_1\tau_{L-1}} \\ \vdots & \vdots & \ddots & \vdots \\ s(k)e^{-j\omega_{N-1}\tau_0} & s(k)e^{-j\omega_{N-1}\tau_1} & \cdots & s(k)e^{-j\omega_{N-1}\tau_{L-1}} \end{bmatrix}$$

Therefore, the system can define a set of multi-dimensional steering vectors in order: to coherently combine measurement data across the set of antenna elements of the receiver; and to calculate a time of arrival estimate (and/or joint time of arrival and angle of arrival estimates) of the ranging signal received at the set of antenna elements based on the measurement data according to the set of multi-dimensional steering vectors.

8.4 Structured Data Representation

In one implementation, in Block S108, the system generates a structured data representation of the set of time domain samples characterized by the set of steering matrices and a set of channel coefficients.

In this implementation, the system: receives the ranging signal at the set of antenna elements; records the set of time domain samples representing the ranging signal; and extracts phase information for the ranging signal. For each antenna element in the set of antenna elements, the system can execute similar methods and techniques described above to represent the ranging signal received at the antenna element: for each time delay in the time delay grid; and for each phase angle in the phase angle grid. The system then combines representations of the ranging signal received at the set of antenna elements into a structured data representation of the set of time domain samples.

More specifically, for each antenna element k in the set of antenna elements, the system can represent the received signal (e.g., the subset of time domain samples representing the ranging signal received at the antenna element) as $z_k$, wherein:

$$z_k = \begin{bmatrix} y_{0,k} \\ y_{1,k} \\ \vdots \\ y_{N-1,k} \end{bmatrix}$$

Additionally, the system can represent a subset of channel coefficients—in the set of channel coefficients and corresponding to the $l^{th}$ time delay value in the time delay grid for the set of phase angle values M in the phase angle grid—as:

$$\gamma_l = \begin{bmatrix} \alpha_{l,0} \\ \alpha_{l,1} \\ \vdots \\ \alpha_{l,M-1} \end{bmatrix}$$

The channel coefficient $\alpha_{l,m}$ represents an amplitude value (e.g., a complex amplitude value, a channel gain, a channel attenuation) for a multipath component exhibiting a time delay value (or time of arrival) $\tau_l$ and a phase angle (or angle of arrival) $\theta_m$.

In another implementation, the system represents the ranging signal received at the antenna element k as:

$$\begin{bmatrix} y_{0,k} \\ y_{1,k} \\ \vdots \\ y_{N-1,k} \end{bmatrix} = \begin{bmatrix} s(k)e^{-j\omega_0\tau_0} & s(k)e^{-j\omega_0\tau_1} & \cdots & s(k)e^{-j\omega_0\tau_{L-1}} \\ s(k)e^{-j\omega_1\tau_0} & s(k)e^{-j\omega_1\tau_1} & \cdots & s(k)e^{-j\omega_1\tau_{L-1}} \\ \vdots & \vdots & \ddots & \vdots \\ s(k)e^{-j\omega_{N-1}\tau_0} & s(k)e^{-j\omega_{N-1}\tau_1} & \cdots & s(k)e^{-j\ N-1\tau_{L-1}} \end{bmatrix} \begin{bmatrix} \gamma_0 \\ \gamma_1 \\ \vdots \\ \gamma_{L-1} \end{bmatrix}$$

More specifically, the system represents the ranging signal received at the antenna element k as $z_k = A_k w$, wherein:

$$z_k = \begin{bmatrix} y_{0,k} \\ y_{1,k} \\ \vdots \\ y_{N-1,k} \end{bmatrix}$$

$$A_k = \begin{bmatrix} s(k)e^{-j\omega_0\tau_0} & s(k)e^{-j\omega_0\tau_1} & \cdots & s(k)e^{-j\omega_0\tau_{L-1}} \\ s(k)e^{-j\omega_1\tau_0} & s(k)e^{-j\omega_1\tau_1} & \cdots & s(k)e^{-j\omega_1\tau_{L-1}} \\ \vdots & \vdots & \ddots & \vdots \\ s(k)e^{-j\omega_{N-1}\tau_0} & s(k)e^{-j\omega_{N-1}\tau_1} & \cdots & s(k)e^{-j\omega_{N-1}\tau_{L-1}} \end{bmatrix}$$

and $$w = \begin{bmatrix} \gamma_0 \\ \gamma_1 \\ \vdots \\ \gamma_{L-1} \end{bmatrix}$$

In another implementation, the system represents the ranging signal—based on a combination of measurements from the set of antenna elements—as:

$$\begin{bmatrix} z_0 \\ z_1 \\ \vdots \\ z_{K-1} \end{bmatrix} = \begin{bmatrix} A_0 \\ A_1 \\ \vdots \\ A_{K-1} \end{bmatrix} w$$

In this implementation, the system generates a structured data representation of the set of time domain samples z characterized by: the set of steering matrices $\mathcal{A}$; a set of channel coefficients w; and a (complex) noise vector n.

More specifically, the system can: define a complex noise vector n; and generate a structured data representation—of the set of time domain samples z representing the ranging signal—as $z = \mathcal{A}w + n$, wherein:

$$z = \begin{bmatrix} z_0 \\ z_1 \\ \vdots \\ z_{K-1} \end{bmatrix}$$

and $$\mathcal{A} = \begin{bmatrix} A_0 \\ A_1 \\ \vdots \\ A_{K-1} \end{bmatrix}$$

Therefore, the system can: coherently combine measurements for the ranging signal received at the set of antenna elements into a structured data representation of the ranging signal; and estimate times of arrival—relative to the first antenna element $k_0$ in the set of antenna elements—of multipath components of the ranging signal based on the structured data representation.

8.5 Sparse Channel Reconstruction

In one implementation, in Block S110, the system calculates a sparse representation of the channel by executing a sparse recovery algorithm based on the structured data representation of the set of time domain samples.

More specifically, the system can compute a sparse solution—based on a regularization technique (e.g., L1-norm regularization, LASSO regularization)—for the following cost function:

$$\hat{w} = \arg\min_{w} \|z - \mathcal{A}w\|^2 + \lambda\|w\|_1$$

In this implementation, the system calculates the sparse representation of the channel according to a regularization parameter $\lambda$ that controls shrinkage (and/or sparsity) of coefficients in the set of coefficients. The system can define (or adjust) the regularization parameter $\lambda$ in order to balance sparsity and accuracy for time of arrival and/or angle of arrival estimation for the ranging signal.

In this implementation, the system can solve (i.e., compute) the cost function to return the sparse solution for the set of channel coefficients representing the channel.

More specifically, the system can calculate the set of channel coefficients for the sparse representation of the channel according to the cost function. Each channel coefficient, in the set of channel coefficients, corresponds to: a time delay value in the set of time delay values; and a phase angle value in the set of phase angle values. Additionally, each channel coefficient, in the set of channel coefficients, is characterized by an amplitude value.

In one example, the system calculates a first channel coefficient in the set of channel coefficients for the sparse representation of the channel. The first channel coefficient corresponds to: a first time delay value in the set of time delay values; and a first phase angle value in the set of phase angle values. The first channel coefficient is characterized by a first amplitude value.

In another example, the system calculates (or isolates) a first subset of channel coefficients, in the set of channel coefficients, by executing L1-norm regularization based on the structured data representation of the set of time domain samples. The first subset of channel coefficients: are characterized by non-zero amplitude values (e.g., non-zero amplitude values exceeding a predefined threshold value); and correspond to a first subset of time delay values, in the set of time delay values, and a first subset of phase angle values in the set of phase angle values.

In this example, the system also calculates (or isolates) a second subset of channel coefficients, in the set of channel coefficients, by executing L1-norm regularization based on the structured data representation of the set of time domain samples. The second subset of channel coefficients: are characterized by amplitude values equal to zero (and/or falling below the predefined threshold value); and correspond to a second subset of time delay values, in the set of time delay values, and a second subset of phase angle values in the set of phase angle values.

Accordingly, by isolating the first subset of channel coefficients characterized by non-zero amplitude values, the system can: identify the first subset of channel coefficients as corresponding to significant multipath components (e.g., a line of sight component) of the ranging signal; and identify the second subset of channel coefficients as corresponding to insignificant multipath components of the ranging signal, thereby enabling the system to estimate times of arrival and angles of arrival—for these significant multipath components of the ranging signal while excluding insignificant multipath components of the ranging signal—based on the first subset of time delay values and the first subset of phase angle values.

8.6 Time of Arrival and Angle of Arrival Estimation

Generally, in Block S112, the system can calculate a time of arrival estimate and/or an angle of arrival estimate for the ranging signal received at the set of antenna elements based on the sparse representation of the channel.

In one implementation, the system calculates a time of arrival estimate and/or an angle of arrival estimate for the ranging signal—relative to the reference antenna element (e.g., the first antenna element $k_0$)—based on the set of coefficients for the sparse representation of the channel.

For example, the system can execute the foregoing methods and techniques to calculate (or isolate) a first subset of channel coefficients, in the set of channel coefficients, by executing L1-norm regularization (e.g., LASSO regularization) based on the structured data representation of the set of time domain samples. The first subset of channel coefficients: are characterized by non-zero amplitude values (e.g., non-zero amplitude values exceeding a predefined threshold value); and correspond to a first subset of time delay values, in the set of time delay values, and a first subset of phase angle values in the set of phase angle values.

In this example, the system can: calculate a set of candidate time of arrival estimates for the ranging signal received at the set of antenna elements based on the subset of time delay values; and calculate a set of candidate angle of arrival estimates for the ranging signal received at the set of antenna elements based on the subset of phase angle values.

More specifically, the system can calculate the first subset of channel coefficients including a first channel coefficient corresponding to: a first time delay value in the first subset of time delay values; and a first phase angle value in the first subset of phase angle values. The system can: calculate a first candidate time of arrival estimate—in the set of candidate time of arrival estimates—corresponding to the first time delay value; and calculate a first candidate angle of arrival estimate—in the set of candidate angle of arrival estimates—corresponding to the first phase angle value. The first candidate time of arrival estimate and the first candidate angle of arrival estimate correspond to a first significant multipath component (e.g., a line of sight component) of the ranging signal.

The system can repeat the foregoing methods and techniques for each channel coefficient in the first subset of channel coefficients: to calculate a candidate time of arrival estimate—in the set of candidate time of arrival estimates—corresponding to a time delay value, in the first subset of time delay values, for the channel coefficient; and to calculate a candidate angle of arrival estimate—in the set of candidate angle of arrival estimates—corresponding to a phase value, in the first subset of phase angle values, for the channel coefficient.

Figure 1A:
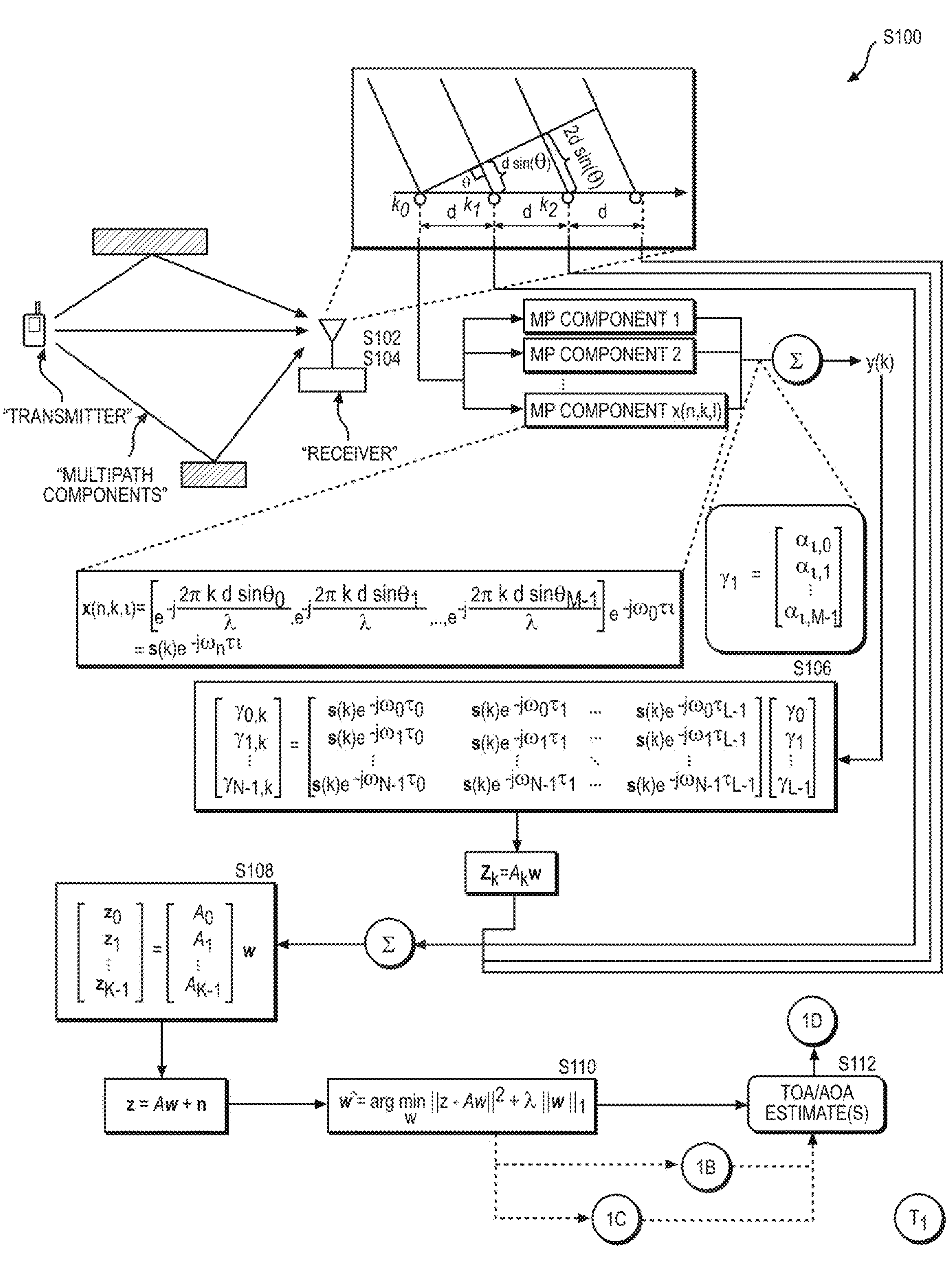
FIGS. 1A, 1B, 1C, and 1D are flowchart representations of a method.
Figure 1B:
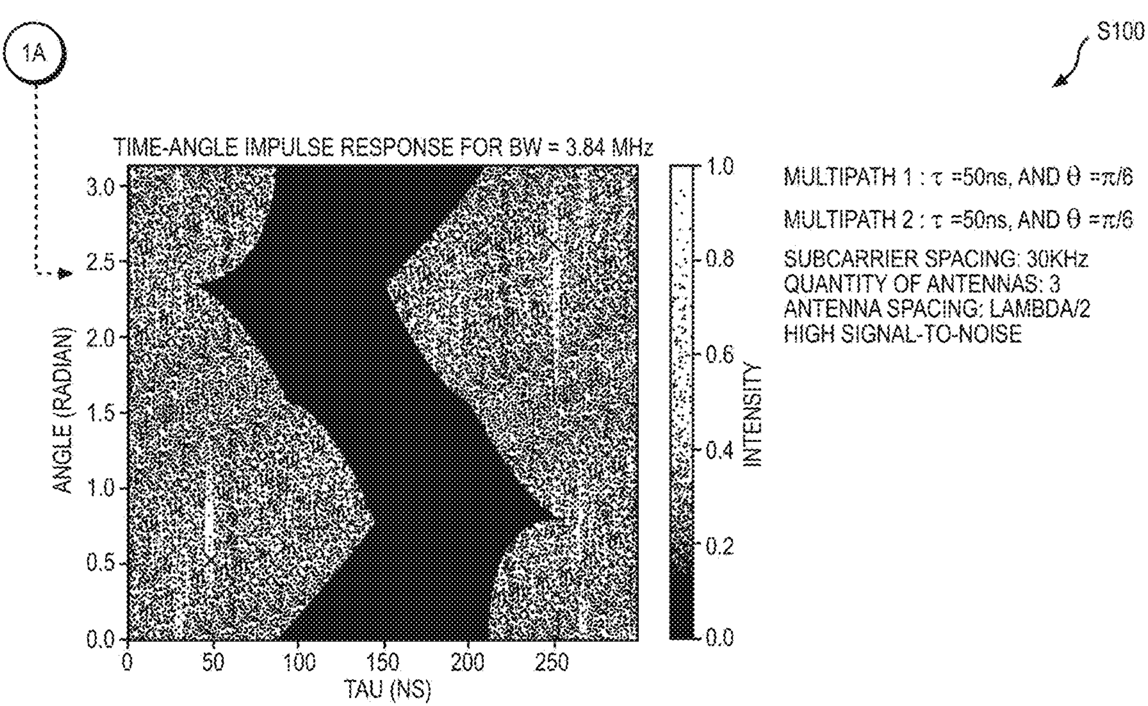
Figure 1B:
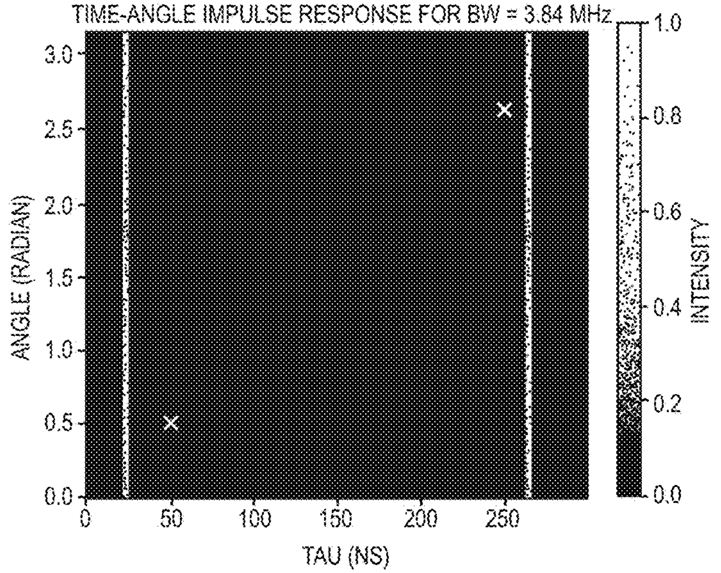
Figure 1C:
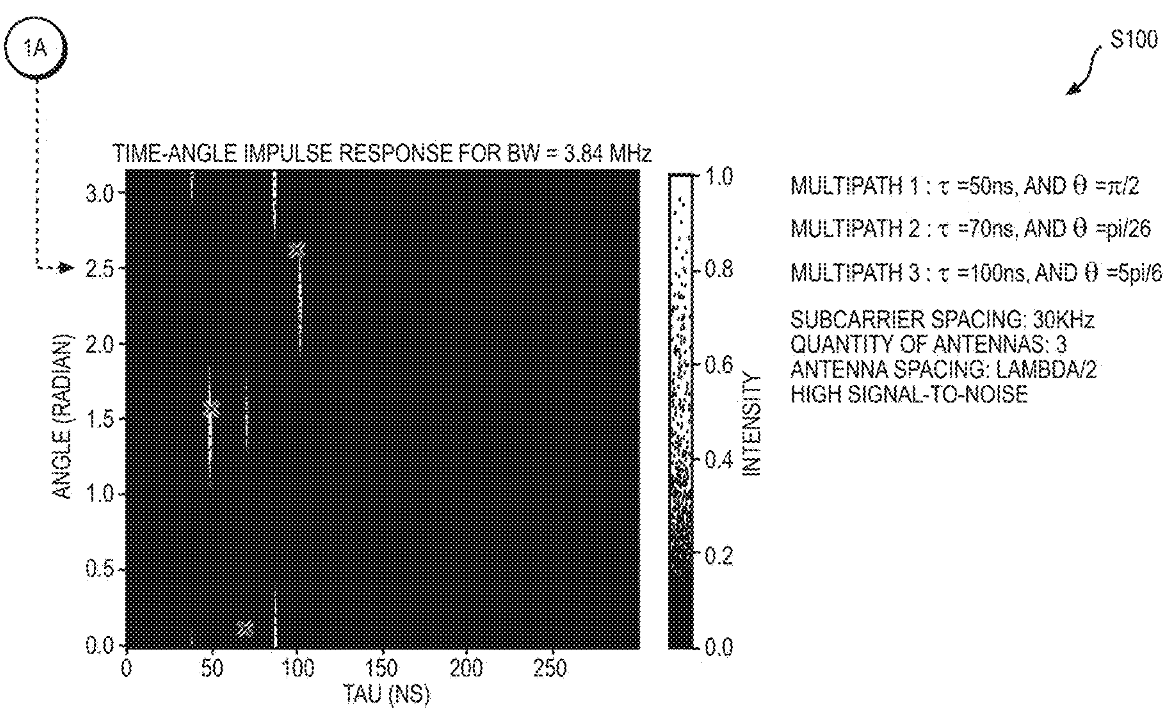
Figure 1C:
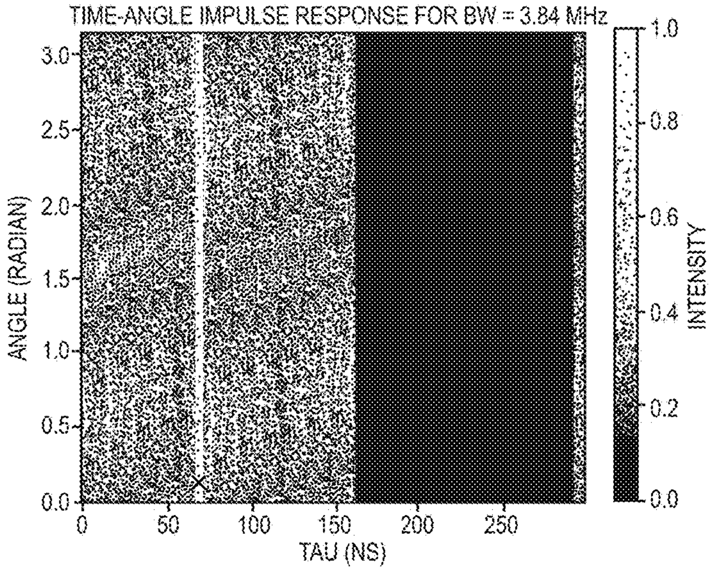
Figure 1D:
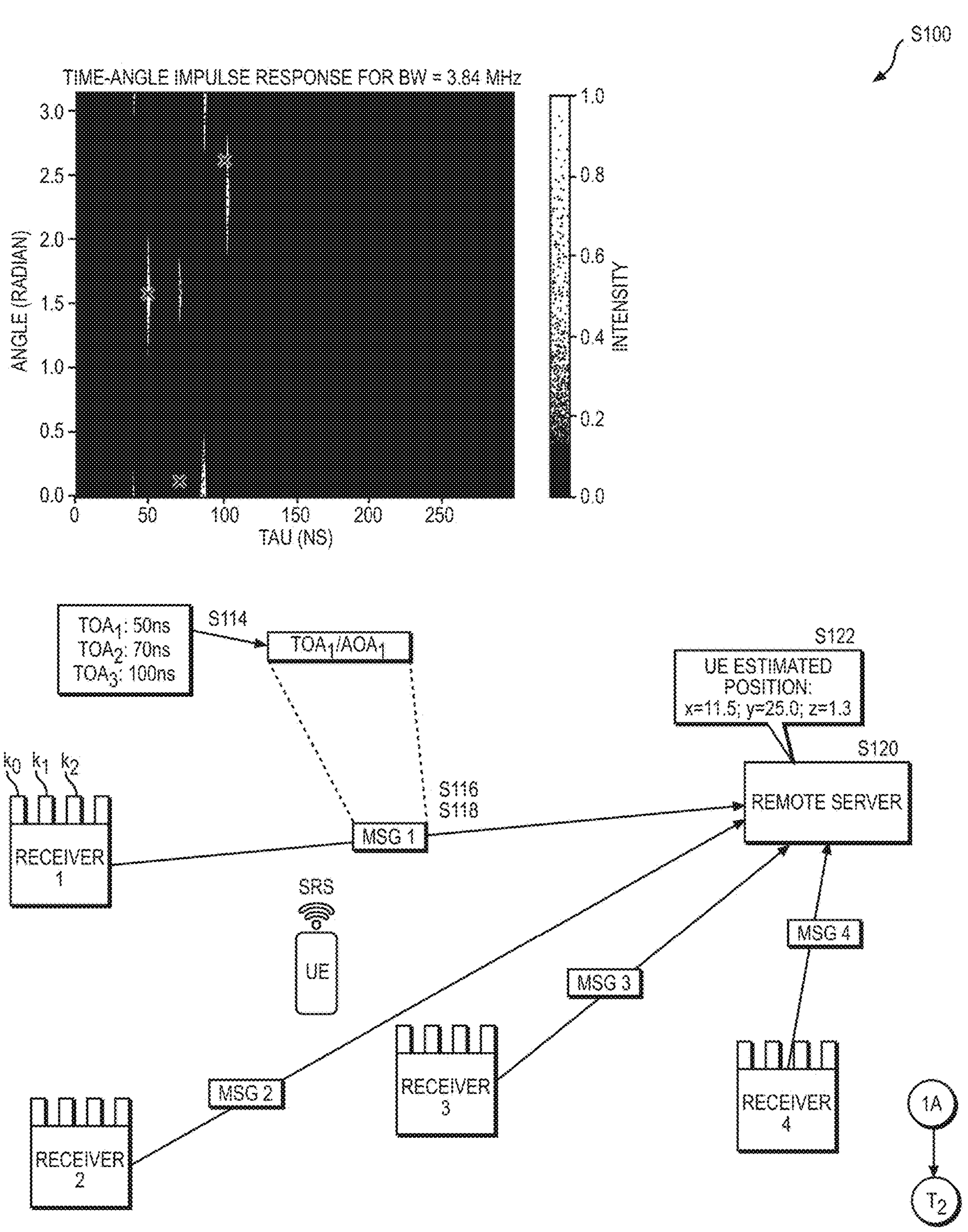

For example, as shown in FIGS. 1B and 1C, for each combination of a time delay value—in the time delay grid—and a phase angle value in the phase angle grid (or "delay-angle pair"), the system can calculate a likelihood (e.g., proportional to amplitude) of estimating an angle of arrival and a time of arrival corresponding to the combination of the time delay value and the phase angle value.

Accordingly, the system can execute angle-of-arrival detection techniques at multiple antenna elements of the receiver—agnostic to an orientation of the receiver relative to the transmitter—to generate angle-based measurement data. Therefore, the system can combine the angle-based measurement data with frequency-based measurement data to increase a solution space for time of arrival estimation, thereby increasing accuracy of time of arrival estimation and/or positioning without incurring additional bandwidth overhead. In particular, based on combined measurement data across the multiple antenna elements of the receiver, the system can thereby execute Blocks of the method S100 to estimate a time of arrival—for a line of sight component of a ranging signal occupying low bandwidth—more accurately than time of arrival estimation techniques according to a single-antenna configuration, as shown in FIGS. 1B and 1C.

8.7 Time of Arrival and Angle of Arrival Reporting

The method S100 includes: generating a message including the set of candidate time of arrival estimates and the set of candidate angle of arrival estimates in Block S116; and transmitting the message to a remote computer system for position estimation of the transmitter in Block S118.

Generally, in Blocks S116 and S118, the system can transmit the set of candidate time of arrival estimates and the set of angle of arrival estimates to a remote computer system for position estimation of the transmitter.

In one implementation, in response to calculating the set of candidate time of arrival estimates and the set of angle of arrival estimates for the ranging signal received at the set of antenna elements, the system: generates a message including the set of candidate time of arrival estimates and the set of candidate angle of arrival estimates in Block S116; and transmits the message to a remote computer system for position estimation of the transmitter in Block S118.

Therefore, the system can: access (candidate) time of arrival estimates and (candidate) angle of arrival estimates of the ranging signal from multiple receivers that received the ranging signal transmitted from the transmitter; and calculate an estimated position of the transmitter based on these time of arrival estimates and/or angle of arrival estimates, such as via time difference of arrival and/or phase difference of arrival multilateration.

8.7.1 Line of Sight Component Selection and Reporting

The method S100 includes: identifying the time of arrival estimate as corresponding to a line of sight component of the ranging signal, the time of arrival estimate representing an earliest time of arrival estimate in the set of candidate time of arrival estimates in Block S114; generating a message including the time of arrival estimate and the angle of arrival estimate in Block S116; and transmitting the message to a remote computer system for position estimation of the transmitter in Block S118.

In one implementation, in response to calculating the set of candidate time of arrival estimates and the set of angle of arrival estimates for significant multipath components of the ranging signal received at the set of antenna elements, the system: identifies an earliest time of arrival estimate, in the set of candidate time of arrival estimates as corresponding to a line of sight component of the ranging signal in Block S114; generates a message including the earliest time of arrival estimate in Block S116; and transmits the message to a remote computer system for position estimation of the transmitter in Block S118.

Additionally, the system can: access an angle of arrival estimate—in the set of candidate angle of arrival estimates—corresponding to the earliest time of arrival estimate; generate the message including the angle of arrival estimate; and transmit the message to a remote computer system for position estimation of the transmitter.

More specifically, the system can execute the foregoing methods and techniques to calculate a first subset of channel coefficients, in the set of channel coefficients, characterized by non-zero amplitude values and corresponding to: a first subset of time delay values in the set of time delay values; and a first subset of phase angle values in the set of phase angle values.

In one example, the system calculates the first subset of channel coefficients including a first channel coefficient corresponding to: a first time delay value in the first subset of time delay values; and a first phase angle value in the first subset of phase angle values. In this example, the system calculates: a first time of arrival estimate, in a set of candidate time of arrival estimates, corresponding to the first time delay value; and a first angle of arrival estimate corresponding to the first phase angle value.

In response to detecting the first time of arrival estimate representing the earliest time of arrival estimate in the set of candidate time of arrival estimates, the system: identifies the first time of arrival estimate as corresponding to a line of sight component of the ranging signal; identifies the first angle of arrival as corresponding to the line of sight component of the ranging signal; generates a message specifying the first time of arrival estimate and the first angle of arrival estimate; and transmits the message to the remote computer system.

In this example, the system: calculates a set of candidate time of arrival estimates for the ranging signal received at the set of antenna elements based on the subset of time delay values; and calculates a set of candidate angle of arrival estimates for the ranging signal received at the set of antenna elements based on the subset of phase angle values.

8.7.2 Angle of Arrival Selection and Reporting

In another example, the system calculates the first subset of channel coefficients including a group of channel coefficients corresponding to: a first time delay value in the first subset of time delay values; and a group of phase angle values in the first subset of phase angle values. In this example, the system calculates: a first time of arrival estimate, in a set of candidate time of arrival estimates, corresponding to the first time delay value; and a group of angle of arrival estimates corresponding to the group of phase angle values.

In response to detecting the first time of arrival estimate representing the earliest time of arrival estimate in the set of candidate time of arrival estimates, the system: identifies the first time of arrival estimate as corresponding to a line of sight component of the ranging signal; and identifies a first angle of arrival estimate—in the group of angle of arrival estimates—exhibiting greatest likelihood of corresponding to the line of sight component of the ranging signal.

More specifically, the system can access a group of amplitude values for a group of channel coefficients corresponding to the group of angle of arrival estimates. The group of channel coefficients can include a first channel coefficient characterized by a first amplitude value, corresponding to the first time delay value (and the first time of arrival estimate), and corresponding to a first phase angle value (and the first angle of arrival estimate). The system can: sort the group of angle of arrival estimates according to the group of amplitude values; and identify the first angle of arrival estimate as corresponding to the line of sight component of the ranging signal in response to identifying the first angle of arrival estimate as exhibiting the greatest amplitude value (e.g., the first amplitude value) in the group of amplitude values.

In this example, the system: generates a message specifying the first time of arrival estimate and the first angle of arrival estimate; and transmits the message to the remote computer system.

8.7.3 Amplitude Filtering

In another example, the system executes the foregoing methods and techniques to calculate a first subset of channel coefficients, in the set of channel coefficients, characterized by non-zero amplitude values and corresponding to: a first subset of time delay values in the set of time delay values; and a first subset of phase angle values in the set of phase angle values.

More specifically, the system calculates the first subset of channel coefficients including: a first channel coefficient, characterized by a first amplitude value, corresponding to a first time delay value and a first phase angle value; and a second channel coefficient, characterized by a second amplitude value, corresponding to a second time delay value and a second phase angle value. The second time delay value exceeds (e.g., is later than) the first time delay value.

The system executes the foregoing methods and techniques to calculate: a first time of arrival estimate—in a set of candidate time of arrival estimates—corresponding to the first time delay value; a first angle of arrival estimate corresponding to the first phase angle value; a second time of arrival estimate, in the set of candidate time of arrival estimates, corresponding to the second time delay value; and a second angle of arrival estimate corresponding to the second phase angle value.

In this example, the system calculates the first time of arrival estimate representing the earliest time of arrival estimate in the set of candidate time of arrival estimates (e.g., the first time of arrival estimate falling below—or earlier than—the second time of arrival estimate). However, the system identifies the second time of arrival estimate as corresponding to a line of sight component of the ranging signal in response to detecting: the first amplitude value exceeding a predefined threshold value; and the second amplitude value falling below the predefined threshold value.

The system then executes the foregoing methods and techniques: to generate a message specifying the second time of arrival estimate and the second angle of arrival estimate; and to transmit the message to the remote computer system.

Accordingly, the system can: identify the first amplitude value of the first channel coefficient as corresponding to a "false peak" in response to detecting the first amplitude value falling below the predefined threshold; and identify the second time of arrival estimate—later than the first time of arrival estimate—as corresponding to a line of sight component of the ranging signal in response to detecting the second amplitude value of the second channel coefficient exceeding the predefined threshold.

Therefore, the system can implement false peak detection in order to reduce error attributed to noise and/or insignificant multipath components of the ranging signal, thereby improving accuracy of position estimation.

8.8 Joint Time of Arrival and Angle of Arrival Estimation at Multiple Receivers The system repeats the foregoing methods and techniques for each receiver in a set of receivers: to access the ranging signal transmitted by the transmitter and received at a set of antenna elements of the receiver via a channel; to record time domain samples representing the ranging signal received at each antenna element; to access steering matrices representing the set of frequencies, a time delay grid, a phase angle grid, and distances between antenna elements relative to a reference antenna element; to generate a structured data representation of the time domain samples characterized by the steering vectors; to calculate a sparse representation of the channel by executing sparse optimization (e.g., L1-norm optimization, LASSO optimization) based on the structured data representation; to calculate a time of arrival estimate and an angle of arrival estimate for the ranging signal received at the receiver based on the sparse representation of the channel; and to transmit the time of arrival estimate and the angle of arrival estimate to the remote computer system.

9. Positioning

The method S100 includes: accessing a set of time of arrival estimates for the ranging signal transmitted by the transmitter and received at a set of receivers including the receiver in Block S120; and calculating an estimated position of the transmitter based on the set of time of arrival estimates in Block S122. The set of time of arrival estimates include the time of arrival estimate for the ranging signal received at the set of antenna elements of the receiver.

Generally, in Blocks S120 and S122, the system can: access time of arrival estimates for the ranging signal—transmitted by a transmitter—received by a set of receivers; and calculate an estimated position of the transmitter based on these time of arrival estimates.

In one implementation, in Block S120, the system (e.g., the remote computer system) accesses a set of time of arrival estimates for the ranging signal received at a set of receivers.

For example, the system can access: a first time of arrival estimate for the ranging signal received at a first receiver in the set of receivers; a second time of arrival estimate for the ranging signal received at a second receiver in the set of receivers; and a third time of arrival estimate for the ranging signal received at a third receiver in the set of receivers.

In another implementation, in Block S122, the system calculates an estimated position of the transmitter based on the set of time of arrival estimates.

More specifically, the system can: calculate a first time difference of arrival between the first receiver and the second receiver based on the first time of arrival estimate and the second time of arrival estimate; calculate a second time difference of arrival between the second receiver and the third receiver based on the second time of arrival estimate and the third time of arrival estimate; and calculate a third time difference of arrival between the third receiver and the first receiver based on the third time of arrival estimate and the first time of arrival estimate.

The system can then calculate the estimated position of the transmitter based on the first time difference of arrival, the second time difference of arrival, and the third time difference of arrival via time difference of arrival multilateration.

Additionally or alternatively, the system can: access angle of arrival estimates for the ranging signal—transmitted by a transmitter—received by a set of receivers; and calculate the estimated position of the transmitter based on these angle of arrival estimates via multilateration.

10. Antenna Switching

Generally, as described above, the system (e.g., a receiver) can include a set of antenna elements K including a first antenna element $k_0$, a second antenna element $k_1$, and a third antenna element $k_2$. Each antenna element is positioned at a known distance d (e.g., a uniform distance, a nonuniform distance) from another antenna element in the set of antenna elements.

In one variation, the system selectively enables an antenna element, in the set of antenna elements, during a target time interval in a set of time intervals.

For example, the system can selectively enable (e.g., exclusively enable): the first antenna element $k_0$ for a first time interval; the second antenna element $k_1$ for a second time interval succeeding the first time interval; and the third antenna element $l_2$ during a third time interval succeeding the second time interval.

In this variation, the system executes the foregoing methods and techniques: to receive the ranging signal at an enabled antenna element, in the set of antenna elements, during the target time interval; to capture a series of time domain samples representing the ranging signal at the enabled antenna element; to extract angular information for the ranging signal at the enabled antenna element; and to store these samples and angular information for the enabled antenna element.

More specifically, the system can: selectively enable the first antenna element $k_0$ for the first time interval; selectively disable the second antenna element $k_1$ for the first time interval; and selectively disable the third antenna element $k_2$ for the first time interval.

During the first time interval, the system can execute the foregoing methods and techniques: to receive a first ranging signal, transmitted from the transmitter, at the first antenna element $k_0$ at a first time in the first time interval; and record a first subset of time domain samples—in a set of time domain samples—representing the first ranging signal received at the first antenna element $k_0$ at the first time. The first ranging signal can include a first set of multiplexed sub-signals characterized by a set of carrier frequencies.

The system can repeat the foregoing methods and techniques for each time interval in the set of time intervals. For example, during the second time interval, the system can: receive a second ranging signal, transmitted from the transmitter, at the second antenna element $k_1$ at a second time in the second time interval; and record a second subset of time domain samples—in the set of time domain samples—representing the second ranging signal received at the second antenna element $k_1$ at the second time. The second ranging signal can include a second set of multiplexed sub-signals (e.g., analogous to the first set of multiplexed sub-signals) characterized by the set of carrier frequencies.

In this variation, the system executes the foregoing methods and techniques: to access steering matrices representing the set of frequencies, a time delay grid, a phase angle grid, and distances between antenna elements relative to a reference antenna element; to generate a structured data representation of the time domain samples—representing ranging signals received at the set of antenna elements during the set of time intervals—characterized by the steering vectors; calculate a sparse representation of the channel by executing sparse signal recovery (e.g., L1-norm optimization, LASSO optimization) based on the structured data representation; and calculate a time of arrival estimate and an angle of arrival estimate for a ranging signal received at the receiver (e.g., the first ranging signal received at the first antenna element $k_0$) based on the sparse representation of the channel.

Therefore, by selectively enabling a single antenna element in the set of antenna elements for a time interval and estimating a time of arrival based on aggregated measurement data for a set of time intervals, the system can maintain measurement diversity from these antenna elements to increase accuracy of the time of arrival estimate while reducing (average) power consumption.

11. Joint Time of Arrival and Angle of Arrival Estimation Via MUSIC

In one variation, the system executes similar methods and techniques as described above: to access a ranging signal transmitted by a transmitter and received at a set of antenna elements of a receiver; to capture time domain samples representing the ranging signal received at each antenna element; to extract angular information for the ranging signal at each antenna element; to coherently combine these samples and phase—aligned angular information—for all antenna elements in the set of antenna elements—into a structured data representation of the ranging signal; to execute a MUSIC algorithm to identify significant multipath components of the ranging signal based on the structured data representation; and to calculate time of arrival estimates (and/or angle of arrival estimates) for these significant multipath components.

In this variation, for each antenna element in the set of antenna elements, the system executes the foregoing methods and techniques to: receive the ranging signal at the antenna element; and to represent the ranging signal—for the $n^{th}$ frequency, in the set of frequencies, and the $k^{th}$ antenna element in the set of antenna elements—as:

$$\gamma_{n,k} = \sum_{l=0}^{L-1} \alpha_l e^{-j2\pi\omega_n\tau_l} e^{\frac{-j2\pi k\, d\cos(\theta_l)}{\lambda}}$$

In this variation, A corresponds to a wavelength of the frequency, and d corresponds to a distance between the antenna element and another antenna element in the set of antenna elements.

The system executes similar methods and techniques described in U.S. patent application Ser. No. 17/511,433: to generate a received ranging signal vector representing the set of time domain samples for the ranging signal received at the set of antenna elements; to calculate a covariance matrix for the received ranging signal vector; to calculate a set of eigenvalues and a set of eigenvectors based on the covariance matrix; and to identify a signal subspace and a noise subspace based on the set of eigenvalues and the set of eigenvectors. Each eigenvalue, in the set of eigenvalues, corresponds to an eigenvector in the set of eigenvectors.

For example, the system can: sort the set of eigenvectors based on corresponding eigenvalues in the set of eigenvalues; group a first subset of eigenvectors, in the set of eigenvectors, into the signal subspace based on a first subset of eigenvalues, in the set of eigenvalues, corresponding to the first subset of eigenvectors; and group a second subset of eigenvectors, in the set of eigenvectors, into the noise subspace based on a second subset of eigenvalues, in the set of eigenvalues, corresponding to the second subset of eigenvectors. The second subset of eigenvalues fall below the first subset of eigenvalues.

More specifically, for each antenna element m in the set of antenna elements, the system generates a matrix (e.g., a Hankel matrix) $Y_m$—in a first set of matrices—representing the subset of time domain samples corresponding to the antenna element m, wherein:

$$Y_m = \begin{bmatrix} y_{0,m} & y_{1,m} & \cdots & y_{M,m} \\ y_{1,m} & y_{2,m} & \cdots & y_{M+1,m} \\ \vdots & \vdots & \ddots & \vdots \\ y_{N-M-1,m} & y_{N-M,m} & \cdots & y_{N-1,m} \end{bmatrix}_{(N-M)\times(M+1)}$$

In this variation, M corresponds to an order of the matrix (e.g., a quantity of time lags). For example, the system can select M (e.g., a value for M), where N−M−1 approximates (e.g., is approximately equal to)

$$\frac{2}{3}N.$$

The system generates an expanded matrix $Y_e$ based on the first set of matrices, wherein:

$$Y_e = \begin{bmatrix} Y_0 & Y_1 & \cdots & Y_J \\ Y_1 & Y_2 & \cdots & Y_{J+1} \\ \vdots & \vdots & \ddots & \vdots \\ Y_{K-J-1} & Y_{K-J} & \cdots & Y_{K-1} \end{bmatrix}_{(K-J)(N-M)\times(J+1)(M+1)}$$

In this variation, K corresponds to a quantity of antenna elements in the set of antenna elements, and K corresponds to an order of spatial expansion.

Additionally, the system can generate a forward-backward smoothed matrix (or variant) $Y_{e_{fb}}$ based on the expanded matrix $Y_e$, wherein:

$$Y_{e_{fb}} = \left[Y_e : \prod \; Y_e^* : \prod\right]$$

In this variation, Π corresponds to a permutation matrix that reverses an order of rows, and $Y_e^*$ corresponds to a complex conjugate of the expanded matrix $Y_e$, wherein:

$$\prod\nolimits_{N\times N} = \begin{bmatrix} 0 & \cdots & 0 & 0 \\ 0 & \cdots & 1 & 0 \\ \vdots & \vdots & \ddots & \vdots \\ 1 & \cdots & 0 & 0 \end{bmatrix}_{N\times N}$$

The system executes a matrix decomposition operation (e.g., a singular value decomposition operation) on the forward-backward smoothed matrix $Y_{e_{fb}}$ (or the expanded matrix $Y_e$,), wherein:

$$Y_{e_{fb}} = U_{2D} \sum\nolimits_{2D} V_{2D}^H$$

In this variation, the system defines a first unitary matrix $U_{2D}$ and a second unitary matrix $V_{2D}$·$\Sigma_{2D}$ corresponds to a diagonal matrix representing singular values (e.g., sorted in decreasing order), and $$V_{2D}^H$$

corresponds to a conjugate transpose of the second unitary matrix $V_{2D}$.

The system identifies: a first subset of columns—characterized by the largest singular values in the first unitary matrix $U_{2D}$—of the first unitary matrix $U_{2D}$ spanning a signal subspace; and a second subset of columns (e.g., the remaining columns of $U_{2D}$ excluding the first subset of columns) of the first unitary matrix $U_{2D}$ spanning a noise subspace.

In this variation, the system: accesses a steering matrix characterized by distances between antenna elements in the set of antenna elements; generates a pseudospectrum characterized by the noise subspace and the steering vector; identifies a set of peaks in the pseudospectrum; and calculates a set of time of arrival estimates corresponding to the set of peaks in the pseudospectrum.

More specifically, the system can access (or define) the steering matrix α(τ, θ), wherein:

$$\alpha(\tau,\theta) = \begin{bmatrix} a(\tau)b_0(\theta) \\ a(\tau)b_1(\theta) \\ \vdots \\ a(\tau)b_{K-1}(\theta) \end{bmatrix}$$

$$a(\tau) = \begin{bmatrix} e^{-j\omega_0\tau} \\ e^{-j\omega_1\tau} \\ \vdots \\ e^{-j\omega_{N-1}\tau} \end{bmatrix}$$

$$b_i(\theta) = e^{\frac{-j2\pi i d\cos(\theta)}{\lambda}}$$

The system then can generate the pseudospectrum P(τ, θ), wherein:

$$P(\tau,\theta) = \frac{1}{\alpha^H(\tau,\theta)E_nE_n^H(\tau,\theta)}$$

In this variation, $E_n$ corresponds to a matrix characterized by columns representing the noise subspace (e.g., the second subset of eigenvectors, the second subset of columns of the first unitary matrix $U_{2D}$).

Because the steering vector α(τ, θ) at true (e.g., actual) multipath delays spans the signal subspace, the steering vector is orthogonal to an eigenvector in the noise subspace $E_n$.

Accordingly, the system can: evaluate the pseudospectrum P(τ, θ) for a set of time delay values τ and a set of phase angle values θ; identify a set of peaks in the pseudospectrum as corresponding to significant multipath components of the ranging signal; and calculate a set of time of arrival estimates and a set of angle of arrival estimates for these significant multipath components of the ranging signal.

12. Joint Time of Arrival and Angle of Arrival Estimation Via Matrix Pencil

The method S100 includes: generating a decomposed representation of the set of time domain samples by executing a matrix decomposition operation on the structured data representation of the set of time domain samples in Block S130; generating a first set of matrices based on the decomposed representation in Block S132; calculating a first set of generalized eigenvalues according to a first matrix pencil characterized by the first set of matrices in Block S134; and calculating a set of angle of arrival estimates for the ranging signal based on the first set of generalized eigenvalues in Block S136. The decomposed representation includes a signal subspace matrix. The first set of matrices includes: a first matrix including a first subset of rows of the signal subspace matrix; and a second matrix including a second subset of rows of the signal subspace matrix.

The method S100 includes: generating a shuffled matrix based on the decomposed representation and a shuffling matrix in Block S138; generating a second set of matrices based on the shuffled matrix in Block S140; calculating a second set of generalized eigenvalues according to a second matrix pencil characterized by the second set of matrices in Block S142; and calculating a set of time of arrival estimates for the ranging signal based on the second set of generalized eigenvalues in Block S144. The second set of matrices includes: a third matrix including a third subset of rows of the shuffled matrix; and a fourth matrix including a fourth subset of rows of the shuffled matrix.

The method S100 includes: selecting a first time of arrival estimate, in the set of time of arrival estimates, as corresponding to a line of sight component of the ranging signal in Block S146; and identifying a first angle of arrival estimate, in the set of angle of arrival estimates, corresponding to the first time of arrival estimate in Block S148.

In another variation, in Blocks S130, S132, S134, S136, S138, S140, S142, S144, S146, and S148, the system executes similar methods and techniques as described above: to access a ranging signal transmitted by a transmitter and received at a set of antenna elements of a receiver; to capture time domain samples representing the ranging signal received at each antenna element; to extract angular information for the ranging signal at each antenna element; to coherently combine these samples and phase-aligned angular information—for all antenna elements in the set of antenna elements—into a structured data representation of the ranging signal; to execute a Matrix Pencil algorithm to identify significant multipath components of the ranging signal based on the structured data representation; and to calculate time of arrival estimates and angle of arrival estimates for these significant multipath components.

More specifically, the system can: generate a Hankel matrix—for each antenna element in the set of antenna elements—representing the subset of time domain samples; generate an expanded matrix representing the Hankel matrices for the set of antenna elements; execute a singular value decomposition operation based on the expanded matrix (e.g., based on a forward-backward smoothed variant of the expanded matrix) to define a first unitary matrix including a signal subspace matrix; generate a first pair of shifted matrices based on the signal subspace matrix; define a first matrix pencil according to the first pair of shifted matrices; calculate a first set of generalized eigenvalues for the first matrix pencil; and calculate a set of angle of arrival estimates for the ranging signal based on the first set of generalized eigenvalues.

Additionally, the system can: access a shuffling matrix; transform the first unitary matrix into a shuffled matrix according to the shuffling matrix; generate a second pair of shifted matrices based on the shuffled matrix; define a second matrix pencil according to the second pair of shifted matrices; calculate a second set of generalized eigenvalues for the first second pencil; and calculate a set of time of arrival estimates for the ranging signal based on the second set of generalized eigenvalues.

The system can then: select an earliest time of arrival estimate—in the set of time of arrival estimates—as corresponding to a line of sight component of the ranging signal; identify an angle of arrival estimate, in the set of angle of arrival estimates, corresponding to the earliest time of arrival estimate (e.g., via a MUSIC algorithm); generate a message specifying the earliest time of arrival estimate and the angle of arrival estimate; and transmit the message to the remote computer system for position estimation of the transmitter.

Therefore, by executing the Matrix Pencil algorithm, the system can reduce computational cost and/or increase response time—relative to L1-norm-based (or LASSO-based) implementations—for joint angle of arrival and time of arrival estimation.

12.1 Signal Reception

In this variation, the system can, for each antenna element in the set of antenna elements, the system executes the foregoing methods and techniques to: receive the ranging signal at the antenna element; and to represent the ranging signal—for the $n^{th}$ frequency, in the set of frequencies, and the $m^{th}$ antenna element in the set of antenna elements—as:

$$y_{n,m} = \sum_{l=0}^{L-1} \alpha_l e^{-j2\pi\omega_n\tau_l} e^{\frac{-j2\pi m d \cos(\theta_l)}{\lambda}}$$

In this variation, λ corresponds to a wavelength of the frequency, and d corresponds to a distance between the antenna element and another antenna element in the set of antenna elements.

For each antenna element in the set of antenna elements, the system executes the foregoing methods and techniques to record a subset of time domain samples—in the set of time domain samples—representing the ranging signal received at the antenna element.

12.2 Matrices

In this variation, for each antenna element m in the set of antenna elements, the system generates a matrix (e.g., a Hankel matrix) $Y_m$—in a first set of matrices—representing the subset of time domain samples corresponding to the antenna element m, wherein:

$$Y_m = \begin{bmatrix} y_{0,m} & y_{1,m} & \cdots & y_{M,m} \\ y_{1,m} & y_{2,m} & \cdots & y_{M+1,m} \\ \vdots & \vdots & \ddots & \vdots \\ y_{N-M-1,m} & y_{N-M,m} & \cdots & y_{N-1,m} \end{bmatrix}_{(N-M)\times(M+1)}$$

In this variation, M corresponds to an order of the matrix (e.g., a quantity of time lags).

The system generates an expanded matrix $Y_e$ based on the first set of matrices, wherein:

$$Y_e = \begin{bmatrix} Y_0 & Y_1 & \dots & Y_J \\ Y_1 & Y_2 & \dots & Y_{J+1} \\ \vdots & \vdots & \ddots & \vdots \\ Y_{K-J-1} & Y_{K-J} & \dots & Y_{K-1} \end{bmatrix}_{(K-J)(N-M)\times(J+1)(M+1)}$$

In this variation, K corresponds to a quantity of antenna elements in the set of antenna elements, and K corresponds to an order of spatial expansion.

Additionally, the system can generate a forward-backward smoothed matrix (or variant) $Y_{e_{fb}}$ based on the expanded matrix $Y_e$, wherein:

$$y_{e_{fb}} = [Y_e \colon \Pi Y_e^* \colon \Pi]$$

In this variation, Π corresponds to a permutation matrix that reverses an order of rows, and $Y_e$* corresponds to a complex conjugate of the expanded matrix $Y_e$.

12.3 Matrix Decomposition

The system executes a matrix decomposition operation (e.g., a singular value decomposition operation) on the forward-backward smoothed matrix $Y_{e_{fb}}$ (or the expanded matrix $Y_e$,), wherein:

$$Y_{e_{fb}} = U_{2D} \sum\nolimits_{2D} V_{2D}^H$$

In this variation, the system defines a first unitary matrix $U_{2D}$ and a second unitary matrix $V_{2D}$. $\Sigma_{2D}$ corresponds to a diagonal matrix representing singular values (e.g., sorted in decreasing order), and $$V_{2D}^H$$

corresponds to a conjugate transpose of the second unitary matrix $V_{2D}$.

The system identifies: a first subset of columns (or the "reduced signal subspace matrix")

$$U_s^{2D}$$

—characterized by the largest singular values in the first unitary matrix $U_{2D}$—of the first unitary matrix $U_{2D}$ spanning a signal subspace; and a second subset of columns $$U_n^{2D}$$

(e.g., the remaining columns of $U_{2D}$ excluding the first subset of columns) of the first unitary matrix $U_{2D}$ spanning a noise subspace.

Accordingly, by executing the matrix decomposition operation on the forward-backward smoothed matrix $Y_{e_{fb}}$, the system can truncate an observation matrix representing the set of time domain samples for the ranging signal in order to isolate the signal space, thereby improving accuracy of time of arrival estimation.

12.4 Matrix Pencil

In this variation, the system: generates a second set of matrices based on the reduced signal subspace matrix $$U_s^{2D};$$

defines a first matrix pencil based on the second set of matrices; and calculates a first set of generalized eigenvalues—corresponding to a set of poles (e.g., special poles) of the ranging signal—according to the first matrix pencil.

More specifically, the system can generate the second set of matrices including: a first matrix $$U_{s1}^{2D}$$

characterized by a first subset of rows (e.g., the first M−1 rows) of the reduced signal subspace matrix $$U_s^{2D};$$

and a second matrix $$U_{s2}^{2D}$$

characterized by a second subset of rows (e.g., the last M−1 rows) of the reduced signal subspace matrix $$U_s^{2D}.$$

In particular, the system generates the second matrix $$U_{s2}^{2D}$$

characterized by the first matrix $$U_{s1}^{2D}$$

exhibiting a sluit by One element.

Additionally or alternatively, the system can calculate a set of ordinary eigenvalues based on the second set of matrices according to:

$$(U_{s2}^{2D})^H (U_{s1}^{2D}) ((U_{s1}^{2D})^H (U_{s1}^{2D}))^{-1}$$

The system can then: define the first matrix pencil $$U_{s2}^{2D} - \gamma U_{s1}^{2D};$$

and calculate the first set of generalized eigenvalues (or special poles) $\hat{L}$ according to the first matrix pencil $$U_{s2}^{2D} - \gamma U_{s1}^{2D},$$

wherein:

$$\hat{L} = \{x_1, x_2, \ldots, x_{\hat{L}}\}$$

$$\gamma = x_l$$

$$x_l = e^{\frac{-j2\pi d \cos(\theta_l)}{\lambda}}$$

12.4 Direction of Arrival Estimation

The system calculates a set of angle of arrival estimates (or "direction of arrival estimates") $\hat{\theta}_l$, based on the first set of generalized eigenvalues $\hat{L}$, wherein:

$$\hat{\theta}_l = \frac{\pi}{2} + \sin^{-1}\left(\frac{\text{angle }(x_l^*)\lambda}{2\pi d}\right)$$

$$l = 1, 2, \ldots, \hat{L}$$

In this variation, $x^*_l$ corresponds to a conjugate of a generalized eigenvalue $x_l$ in the first set of generalized eigenvalues.

12.5 Time of Arrival Estimation

The system executes similar methods and techniques described above: to generate a time domain matrix (e.g., a Hankel matrix) representing the set of time domain samples for the set of frequencies; to identify a reduced signal subspace matrix by executing a matrix decomposition operation (e.g., a singular value decomposition operation) on the time domain matrix; to define a second matrix pencil based on the reduced signal subspace matrix; to calculate a second set of generalized eigenvalues $\hat{L}$ according to the second matrix pencil; and to calculate a set of time of arrival estimates $\hat{\tau}_l$ based on the second set of generalized eigenvalues.

12.5.1 Time of Arrival Estimation Via Shuffling Matrix

Alternatively, rather than executing a (second) matrix decomposition operation (e.g., a singular value decomposition operation) based on the time domain matrix, the system can: access a shuffling matrix P; and transform the first unitary matrix $U_{2D}$—associated with the (first) matrix decomposition operation on the forward-backward smoothed matrix $Y_{e_{fb}}$—according to the shuffling matrix P into a shuffled matrix $$U_{Shf}^{2D},$$

wherein $$U_{Shf}^{2D} = PU_{2D}$$

For example, the system can access (or define) the shuffling matrix P, wherein:

$$P = \begin{bmatrix} s(1) \\ s(1 + lChan) \\ s(1 + 2lChan) \\ \vdots \\ s(1 + (lAnts - 1)lChan) \\ s(2) \\ s(2 + lChan) \\ s(2 + 2lChan) \\ \vdots \\ s(2 + (lAnts - 1)lChan) \\ \vdots \\ s(lChan) \\ s(lChan + lChan) \\ s(lChan + 2lChan) \\ \vdots \\ s(lChan + (lAnts - 1)lChan) \end{bmatrix}$$

$$lChan = N - M$$

$$lAnts = K - J$$

In this example, each element s(i): represents a column vector characterized by a size of lAnts×lChan; and includes a value of 1 at the $i^{th}$ position and a value of o at (all) other positions.

The system can then execute similar methods and techniques described above: to generate a third set of matrices based on the shuffled matrix $$U_{Shf}^{2D};$$

to define a second matrix pencil based on the third set of matrices; and to calculate a second set of generalized eigenvalues—corresponding to a set of poles (e.g., special poles) of the ranging signal—according to the second matrix pencil.

More specifically, the system can generate the third set of matrices including: a third matrix $$U_{Shf1}^{2D}$$

characterized by a first subset of rows (e.g., the first j-1 rows) of the shuffled matrix $$U_{Shf}^{2D};$$

and a fourth matrix $$U^{2D}_{Shf2}$$

characterized by a second subset of rows (e.g., the last j-1 rows) of the shuffled matrix $$U^{2D}_{Shf}.$$

The system can then: define the pencil matrix $$U^{2D}_{Shf2} - \gamma U^{2D}_{Shf1};$$

and calculate the second set of generalized eigenvalues (or special poles) $\hat{L}$ according to the second pencil matrix $$U^{2D}_{Shf2} - \gamma U^{2D}_{Shf1},$$

wherein:

$$\hat{L} = \{z_1, z_2, \ldots, z_{\hat{L}}\}$$

$$\gamma = z_l$$

$$z_l = e^{-j2\pi\omega_0\tau_l}$$

The system calculates a set of time of arrival estimates $\hat{\tau}_l$, based on the second set of generalized eigenvalues $\hat{L}$, wherein:

$$\hat{\tau}_l = \frac{\text{angle }(z_l^*)}{\omega_0}$$

$$l = 1, 2, \ldots, \hat{L}$$

In this variation, $z^*_l$ corresponds to a conjugate of a generalized eigenvalue $z_l$ in the second set of generalized eigenvalues.

Therefore, by transforming the first unitary matrix $U_{2D}$—associated with the (first) matrix decomposition operation on the forward-backward smoothed matrix $Y_{e_{fb}}$—according to the permutation matrix P, the system can bypass execution of a second matrix decomposition operation in order to calculate the set of time of arrival estimates, thereby reducing computational cost and/or increasing response time for joint angle of arrival and time of arrival estimation.

12.6 Time of Arrival and Angle of Arrival Matching

In this variation, the system: selects a first time of arrival estimate, in the set of time of arrival estimates, as corresponding to a line of sight component for the ranging signal; and identifies an angle of arrival estimate—in the set of angle of arrival estimates—corresponding to the first time of arrival estimate, such as via a MUSIC algorithm.

For example, the system can select the first time of arrival estimate $\hat{\tau}_{LOS}$, representing the earliest (e.g., smallest) time of arrival estimate in the set of time of arrival estimates, as corresponding to the line of sight component for the ranging signal.

In this example, the system can execute the foregoing methods and techniques: to generate a received ranging signal vector representing the set of time domain samples for the ranging signal received at the set of antenna elements; to calculate a covariance matrix for the received ranging signal vector; to calculate a set of eigenvalues and a set of eigenvectors based on the covariance matrix; and to identify a signal subspace and a noise subspace $E_n$ based on the set of eigenvalues and the set of eigenvectors.

The system can then: access a steering matrix $\alpha(\tau, \theta)$ characterized by distances between antenna elements in the set of antenna elements; and generate a pseudospectrum $P(\tau)$ characterized by the noise subspace $E_n$ and the steering vector $\alpha(\tau, \theta)$, wherein:

$$P(\tau, \theta) = \frac{1}{\alpha^H(\tau, \theta)E_nE_n^H(\tau, \theta)}$$

In this variation, the system identifies the angle of arrival estimate $\hat{\theta}_{LOS}$—in the set of angle of arrival estimates $\Theta$ and corresponding to the first time of arrival estimate $\hat{\tau}_{Los}$—based on the set of angle of arrival estimates and the following objective function:

$$\hat{\theta}_{LOS} = \arg \max_{\theta \in \Theta} \frac{1}{\alpha^H(\tau, \theta)E_nE_n^H(\tau, \theta)}$$

$$\Theta = \{\hat{\theta}_1, \hat{\theta}_2, \ldots, \hat{\theta}_{\hat{L}}\}$$

More specifically, the system can identify the angle of arrival estimate $\hat{\theta}_{LOS}$ based on the first time of arrival estimate $\hat{\tau}_{LOS}$, the set of angle of arrival estimates, and the following objective function:

$$\hat{\theta}_{LOS} = \arg \max_{\theta \in \Theta} \frac{1}{\alpha^H(\hat{\tau}_{LOS}, \theta)E_nE_n^H(\hat{\tau}_{LOS}, \theta)}$$

$$\Theta = \{\hat{\theta}_1, \hat{\theta}_2, \ldots, \hat{\theta}_{\hat{L}}\}$$

Accordingly, the system can: evaluate the pseudospectrum $P(\tau, \theta)$ according to the angle of arrival estimates $\Theta$ and the first time of arrival estimate $\hat{\tau}_{LOS}$; and identify a peak in the pseudospectrum as corresponding to the angle of arrival estimate $\hat{\theta}_{LOS}$ for the line of sight component of the ranging signal.

Therefore, because the system evaluates the objective function for the set of angle of arrival estimates calculated from the first set of generalized eigenvectors (rather than a larger quantity of candidate phase angles in a phase angle grid), the system can reduce computational cost and/or increase response time for joint angle of arrival and time of arrival estimation.

13. Estimating Quantity of Multipath Components

In one implementation, the system executes similar methods and techniques described above: to access a ranging signal transmitted by a transmitter and received at a set of antenna elements of a receiver; to capture time domain samples representing the ranging signal received at each antenna element; to extract angular information for the ranging signal at each antenna element; to coherently combine these samples and phase-aligned angular information—for all antenna elements in the set of antenna elements—into a sample covariance matrix of the ranging signal; to calculate a set of eigenvalues and a set of eigenvectors based on the sample covariance matrix; and to identify a signal subspace and a noise subspace based on the set of eigenvalues and the set of eigenvectors.

In this implementation, the system calculates an estimated quantity of (significant) multipath components of the ranging signal based on the set of eigenvalues.

Therefore, the system can implement the foregoing MUSIC and/or Matrix Pencil algorithms—according to the estimated quantity of multipath components—in order to estimate channel impulse responses of the ranging signal at the set of antenna elements.

13.1 Received Signal Matrix

In another implementation, the system similar methods and techniques described above to receive the ranging signal—including a set of multiplexed sub-signals characterized by a set of frequencies—at a set of antenna elements of a receiver. The set of frequencies include N frequencies, and the set of antenna elements include M antenna elements. The system can receive k narrowband sub-signals (corresponding to significant multipath components of the ranging signal) at the set of antenna elements.

In this implementation, the system: accesses an array steering matrix A; accesses a source signal matrix S; a noise vector (e.g., an additive white Gaussian noise vector) W, wherein:

$A \in \mathbb{C}^{M \times k}$ $S \in \mathbb{C}^{k \times N}$ $W \in \mathbb{C}^{M \times N}$ More specifically, the noise vector W includes a set of entries. Each entry, in the set of entries, is characterized by: a mean of zero; and a variance of $\sigma^2$.

In another implementation, the system executes similar methods and techniques described above to represent the ranging signal (e.g., time domain samples representing the ranging signal received at the antenna elements) as a received signal matrix X based on the array steering matrix A, the source signal matrix S, and the noise vector W, wherein:

$$X = AS + W$$

13.2 Sample Covariance Matrix and Matrix Decomposition

In one implementation, the system executes the foregoing methods and techniques: to calculate (or access) a sample covariance matrix for the received signal matrix X; to calculate a set of eigenvalues and a set of eigenvectors based on the sample covariance matrix; and to identify a signal subspace and a noise subspace based on the set of eigenvalues and the set of eigenvectors.

13.2.1 Eigenvalue Decomposition

In one example, the system calculates (or accesses) the sample covariance matrix $\hat{R}$, wherein:

$$\hat{R} = \frac{1}{N} X X^H$$

In this example, the system: accesses (or defines) a diagonal matrix $\Lambda$ of eigenvalues sorted in descending order (e.g., $\lambda_1 \geq \lambda_2 \geq \ldots \geq \lambda_M$); accesses (or defines) a set of eigenvectors E; and executes a matrix decomposition operation (e.g., an eigenvalue decomposition operation) on the sample covariance matrix $\hat{R}$ based on the diagonal matrix $\Lambda$ and the set of eigenvectors E to identify a signal subspace and a noise subspace, wherein:

$$\hat{R} = E \Lambda E^H$$

In this example, the system identifies: a first subset of eigenvectors—corresponding to the largest eigenvalues—in the set of eigenvectors E spanning a signal subspace; and a second subset of eigenvectors (e.g., the remaining eigenvectors in the set of eigenvectors E excluding the first subset of eigenvectors) in the set of eigenvectors spanning a noise subspace.

13.2.2 Singular Value Decomposition

In another example, the system executes a matrix decomposition operation (e.g., a singular value decomposition operation) on the received signal matrix X, wherein:

$$X = U \Sigma V^H$$

In this example, the system defines a first unitary matrix U and a second unitary matrix V, $\Sigma$ corresponds to a diagonal matrix representing singular values (e.g., sorted in decreasing order) $\sigma_i$, and $V^H$ corresponds to a conjugate transpose of the second unitary matrix V. The system defines a relationship between eigenvalues $\lambda_i$ and singular values $\sigma_i$, wherein:

$$\lambda_i = \sigma_i^2$$

The system identifies: a first subset of columns—characterized by the largest singular values in the first unitary matrix U—of the first unitary matrix U spanning a signal subspace; and a second subset of columns (e.g., the remaining columns of U excluding the first subset of columns) of the first unitary matrix U spanning a noise subspace.

13.3 Energy-based Thresholding

In one implementation, the system calculates an estimated quantity k of (significant) multipath components of the ranging signal based on the set of eigenvalues and a predefined threshold $\eta$ (e.g., 90%, 95%), wherein:

$$k = \arg \min_k \left\{ \frac{\sum_{i=1}^{k} \lambda_i}{\sum_{i=1}^{M} \lambda_i} \geq \eta \right\}$$

Accordingly, because total energy of the ranging signal is represented by a sum of the set of eigenvalues (or the set of singular values), the system can select (or identify) the estimated quantity k of significant multipath components of the ranging signal based on cumulative energy (e.g., cumulative energy attributed to the estimated quantity k of significant multipath components exceeding the predefined threshold η).

13.4 Minimum Description Length

In one variation, the system: accesses a likelihood function L(k) for a second subset of eigenvalues (e.g., $\Delta_{k+1}, \ldots, \Delta_M$), in the set of eigenvalues, spanning the noise subspace; defines a geometric mean $G_k$ of the likelihood function L(k); defines an arithmetic mean $A_k$ of the likelihood function L(k); derives a number of degrees of freedom k(2M−k) in the signal subspace; and derives a Minimum Description Length function MDL(k) based on the geometric mean $G_k$, the arithmetic mean $A_k$, wherein:

$$L(k) = -\frac{N}{2}\sum_{i=k+1}^{M}\log\lambda_i$$

$$G_k = \left(\sum_{i=k+1}^{M}\lambda_i\right)^{\frac{1}{M-k}}$$

$$A_k = \frac{1}{M-k}\sum_{i=k+1}^{M}\lambda_i$$

$$MDL(k) = -\log\left(\sum_{i=k+1}^{M}\lambda_i^{\frac{1}{M-k}} / \frac{1}{M-k}\sum_{i=k+1}^{M}\lambda_i\right)^{(M-k)N} + \frac{1}{2}k(2M-k)\log N$$

In this variation, the system calculates the estimated quantity k* of (significant) multipath components of the ranging signal based on the Minimum Description Length function MDL(k), wherein:

$$k* = \arg\min_k MDL(k)$$

More specifically, the system can calculate the estimated quantity k* of (significant) multipath components of the ranging signal corresponding to a quantity of components k that minimize the Minimum Description Length function MDL(k).

14. Disclaimers

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for joint time of arrival and angle of arrival estimation for a signal, the method comprising:

accessing a ranging signal transmitted from a transmitter and received at a set of antenna elements of a receiver via a channel, the ranging signal comprising a set of multiplexed sub-signals, each multiplexed sub-signal, in the set of multiplexed sub-signals, characterized by a frequency in a set of frequencies;

for each antenna element in the set of antenna elements:

recording a subset of time domain samples, in a set of time domain samples, representing the ranging signal received at the antenna element; and accessing a steering matrix, in a set of steering matrices, characterized by:

the set of frequencies;

a set of time delay values;

a set of phase angle values; and a distance between the antenna elements and a reference antenna element in the set of antenna elements;

generating a structured data representation of the set of time domain samples characterized by the set of steering matrices and a set of channel coefficients;

calculating a sparse representation of the channel by:

executing a sparse recovery algorithm based on the structured data representation of the set of time domain samples; and calculating a first channel coefficient in the set of channel coefficients for the sparse representation of the channel, the first channel coefficient corresponding to a first time delay value in the set of time delay values and a first phase angle value in the set of phase angle values;

calculating a time of arrival estimate based on the first time delay value and an angle of arrival estimate for the ranging signal received at the set of antenna elements based on the sparse representation of the channel by:

calculating the time of arrival estimate for the ranging signal based on the first time delay value; and calculating the angle of arrival estimate for the ranging signal based on the first phase angle value.

2. The method of claim 1:

wherein calculating the first channel coefficient comprises calculating the first channel coefficient characterized by an amplitude value; and wherein calculating the time of arrival estimate for the ranging signal comprises calculating the time of arrival estimate for the ranging signal based on the first time delay value in response to detecting the amplitude value exceeding a predefined threshold value.

3. The method of claim 1:

wherein calculating the sparse representation of the channel comprises:

calculating the first channel coefficient characterized by a first amplitude value; and calculating a second channel coefficient in the set of channel coefficients for the sparse representation of the channel, the second channel coefficient:

characterized by a second amplitude value; and corresponding to a second delay value in the set of time delay values, the second delay value falling below the first time delay value; and further comprising:

identifying the time of arrival estimate as corresponding to a line of sight component of the ranging signal in response to detecting:

the first amplitude value exceeding a predefined threshold value; and the second amplitude value falling below the predefined threshold value;

generating a message comprising the time of arrival estimate and the angle of arrival estimate; and transmitting the message to a remote computer system for position estimation of the transmitter.

4. The method of claim 1:

wherein calculating the sparse representation of the channel comprises isolating a subset of channel coefficients, in the set of channel coefficients, by executing $L_1$-norm regularization based on the structured data representation of the set of time domain samples, the subset of channel coefficients corresponding to a subset of time delay values, in the set of time delay values, and a subset of phase angle values in the set of phase angle values; and wherein calculating the time of arrival estimate and the angle of arrival estimate for the ranging signal comprises:

calculating a set of candidate time of arrival estimates for the ranging signal received at the set of antenna elements based on the subset of time delay values, the set of candidate time of arrival estimates comprising the time of arrival estimate; and calculating a set of candidate angle of arrival estimates for the ranging signal received at the set of antenna elements based on the subset of phase angle values, the set of candidate angle of arrival estimates comprising the angle of arrival estimate.

5. The method of claim 4, further comprising:

identifying the time of arrival estimate as corresponding to a line of sight component of the ranging signal, the time of arrival estimate representing an earliest time of arrival estimate in the set of candidate time of arrival estimates;

generating a message comprising the time of arrival estimate and the angle of arrival estimate; and transmitting the message to a remote computer system for position estimation of the transmitter.

6. The method of claim 4, further comprising:

generating a message comprising the set of candidate time of arrival estimates and the set of candidate angle of arrival estimates; and transmitting the message to a remote computer system for position estimation of the transmitter.

7. The method of claim 1:

wherein recording the subset of time domain samples for each antenna element in the set of antenna elements comprises:

recording a first subset of time domain samples, in the set of time domain samples, representing the ranging signal received at the reference antenna element comprising a first antenna element in the set of antenna elements; and recording a second subset of time domain samples, in the set of time domain samples, representing the ranging signal received at a second antenna element in the set of antenna elements;

wherein accessing the steering matrix for each antenna element in the set of antenna elements comprises:

accessing a first steering matrix for the first antenna element, the first steering matrix representing the set of frequencies, the set of time delay values, and the set of phase angle values; and accessing a second steering matrix for the second antenna element, the second steering matrix representing the set of frequencies, the set of time delay values, the set of phase angle values, and a first distance between the first antenna element and the second antenna element; and wherein calculating the time of arrival estimate and the angle of arrival estimate for the ranging signal comprises calculating the time of arrival estimate and the angle of arrival estimate for the ranging signal relative to the first antenna element.

8. The method of claim 7:

wherein recording the subset of time domain samples for each antenna element in the set of antenna elements comprises recording a third subset of time domain samples, in the set of time domain samples, representing the ranging signal received at a third antenna element in the set of antenna elements, the set of antenna elements comprising a uniform linear array of antenna elements; and wherein accessing the steering matrix for each antenna element in the set of antenna elements comprises accessing a third steering matrix for the third antenna element, the third steering matrix representing the set of frequencies, the set of time delay values, the set of phase angle values, and a second distance between the first antenna element and the third antenna element.

9. The method of claim 1:

wherein accessing the ranging signal comprises:

selectively enabling a first antenna element, in the set of antenna elements, for a first time interval;

receiving a first ranging signal, transmitted from the transmitter, at the first antenna element at a first time in the first time interval, the first ranging signal comprising the set of multiplexed sub-signals;

selectively enabling a second antenna element, in the set of antenna elements, for a second time interval succeeding the first time interval; and receiving a second ranging signal, transmitted from the transmitter, at the second antenna element at a second time in the second time interval, the second ranging signal comprising a second set of multiplexed sub-signals, each multiplexed sub-signal, in the set of multiplexed sub-signals, characterized by a frequency in the set of frequencies;

wherein recording the subset of time domain samples for each antenna element in the set of antenna elements comprises:

recording a first subset of time domain samples, in the set of time domain samples, representing the first ranging signal received at the first antenna element at the first time; and recording a second subset of time domain samples, in the set of time domain samples, representing the second ranging signal received at the second antenna element at the second time; and wherein generating the structured data representation of the set of time domain samples comprises generating the structured data representation of the set of time domain samples during a time period succeeding the second time interval.

10. The method of claim 9:

wherein selectively enabling the first antenna element comprises selectively disabling the second antenna element for the first time interval; and wherein selectively enabling the second antenna element comprises selectively disabling the first antenna element for the second time interval.

11. The method of claim 1, wherein accessing the steering matrix for each antenna element in the set of antenna elements comprises:

accessing a time delay grid representing the set of time delay values;

accessing a phase angle grid representing the set of phase angle values; and for each antenna element in the set of antenna elements, defining the steering matrix:

spanning the set of frequencies, the time delay grid, and the phase angle grid; and representing the distance between the antenna element and the reference antenna element.

12. The method of claim 1, wherein accessing the steering matrix for each antenna element in the set of antenna elements comprises accessing the antenna element characterized by the set of frequencies exhibiting a bandwidth falling within four megahertz.

13. The method of claim 1, wherein calculating the sparse representation of the channel comprises calculating the sparse representation of the channel by executing least absolute shrinkage and selection operator regularization based on the structured data representation of the set of time domain samples.

14. The method of claim 1, further comprising:

accessing a set of time of arrival estimates for the ranging signal transmitted by the transmitter and received at a set of receivers comprising the receiver, the set of time of arrival estimates comprising the time of arrival estimate for the ranging signal received at the set of antenna elements of the receiver; and calculating an estimated position of the transmitter based on the set of time of arrival estimates.

15. A method for joint time of arrival and angle of arrival estimation for a signal, the method comprising:

accessing a ranging signal transmitted from a transmitter and received at a set of antenna elements of a receiver, the ranging signal comprising a set of multiplexed sub-signals, each multiplexed sub-signal, in the set of multiplexed sub-signals, characterized by a frequency in a set of frequencies;

for each antenna element in the set of antenna elements, recording a subset of time domain samples, in a set of time domain samples, representing the ranging signal received at the antenna element;

generating a structured data representation of the set of time domain samples;

generating a decomposed representation of the set of time domain samples by executing a matrix decomposition operation on the structured data representation of the set of time domain samples, the decomposed representation comprising a signal subspace matrix;

generating a first set of matrices based on the decomposed representation, the first set of matrices comprising:

a first matrix comprising a first subset of rows of the signal subspace matrix; and a second matrix comprising a second subset of rows of the signal subspace matrix;

calculating a first set of generalized eigenvalues according to a first matrix pencil characterized by the first set of matrices;

calculating a set of angle of arrival estimates for the ranging signal based on the first set of generalized eigenvalues;

generating a shuffled matrix based on the decomposed representation and a shuffling matrix;

generating a second set of matrices based on the shuffled matrix, the second set of matrices comprising:

a third matrix comprising a third subset of rows of the shuffled matrix; and a fourth matrix comprising a fourth subset of rows of the shuffled matrix;

calculating a second set of generalized eigenvalues according to a second matrix pencil characterized by the second set of matrices;

calculating a set of time of arrival estimates for the ranging signal based on the second set of generalized eigenvalues;

selecting a first time of arrival estimate, in the set of time of arrival estimates, as corresponding to a line of sight component of the ranging signal; and identifying a first angle of arrival estimate, in the set of angle of arrival estimates, corresponding to the first time of arrival estimate.

16. The method of claim 15:

wherein generating the first structured data representation of the set of time domain samples comprises:

for each antenna element in the set of antenna elements, generating a Hankel matrix, in a third set of matrices, representing the subset of time domain samples; and generating an expanded matrix representing the third set of matrices;

wherein generating the decomposed representation of the set of time domain samples comprises executing a singular value decomposition operation based on the expanded matrix to define a first unitary matrix comprising the signal subspace matrix; and wherein generating the shuffled matrix comprises generating the shuffled matrix by transforming the first unitary matrix according to the shuffling matrix.

17. The method of claim 15:

wherein selecting the first time of arrival estimate comprises identifying the first time of arrival estimate as corresponding to the line of sight component of the ranging signal, the time of arrival estimate representing an earliest time of arrival estimate in the set of time of arrival estimates; and wherein identifying the first angle of arrival estimate corresponding to the first time of arrival estimate comprises:

calculating a covariance matrix for a received ranging signal vector representing the set of time domain samples;

calculating a set of eigenvalues and a set of eigenvectors based on the covariance matrix;

identifying a noise subspace based on the set of eigenvalues and the set of eigenvectors;

generating a pseudospectrum characterized by the noise subspace and a steering vector, the steering vector characterized by the first time of arrival estimate and the set of angle of arrival estimates; and identifying the first angle of arrival estimate corresponding to a peak in the pseudospectrum.

18. The method of claim 15, further comprising:

generating a message comprising the first time of arrival estimate and the first angle of arrival estimate; and transmitting the message to a remote computer system for position estimation of the transmitter.

19. A method for joint time of arrival and angle of arrival estimation for a signal, the method comprising:

accessing a ranging signal transmitted from a transmitter and received at a set of antenna elements of a receiver via a channel, the ranging signal comprising a set of multiplexed sub-signals, each multiplexed sub-signal, in the set of multiplexed sub-signals, characterized by a frequency in a set of frequencies;

for each antenna element in the set of antenna elements:

recording a subset of time domain samples, in a set of time domain samples, representing the ranging signal received at the antenna element; and accessing a steering matrix, in a set of steering matrices, characterized by:

the set of frequencies;

a set of time delay values;

a set of phase angle values; and a distance between the antenna elements and a reference antenna element in the set of antenna elements;

generating a structured data representation of the set of time domain samples characterized by the set of steering matrices and a set of channel coefficients;

calculating a sparse representation of the channel by:

executing a sparse recovery algorithm based on the structured data representation of the set of time domain samples; and isolating a subset of channel coefficients, in the set of channel coefficients, by executing L1-norm regularization based on the structured data representation of the set of time domain samples, the subset of channel coefficients corresponding to a subset of time delay values, in the set of time delay values, and a subset of phase angle values in the set of phase angle values; and calculating a time of arrival estimate based on the first time delay value and an angle of arrival estimate for the ranging signal received at the set of antenna elements based on the sparse representation of the channel by:

calculating a set of candidate time of arrival estimates for the ranging signal received at the set of antenna elements based on the subset of time delay values, the set of candidate time of arrival estimates comprising the time of arrival estimate; and calculating a set of candidate angle of arrival estimates for the ranging signal received at the set of antenna elements based on the subset of phase angle values, the set of candidate angle of arrival estimates comprising the angle of arrival estimate.

* * * * *